United States Patent
Funahata et al.

(10) Patent No.: US 6,476,890 B1
(45) Date of Patent: Nov. 5, 2002

(54) REFLECTIVE COLOR LIQUID CRYSTAL DISPLAY APPARATUS WITH COLORED POLYMER LAYER

(75) Inventors: Katsuyuki Funahata; Shinichi Komura; Kazuhiro Kuwabara; Osamu Itou, all of Hitachi; Katsumi Kondo, Mito; Makoto Yoneya, Hitachinaka; Makoto Abe, Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/425,614

(22) Filed: Oct. 22, 1999

(30) Foreign Application Priority Data

Oct. 23, 1998 (JP) .............................. 10-301799
May 17, 1999 (JP) .............................. 11-135378

(51) Int. Cl.$^7$ .............................. G02F 1/1335
(52) U.S. Cl. .................. 349/113; 349/138; 349/110
(58) Field of Search .................. 349/112, 113, 349/122, 138, 110

(56) References Cited

U.S. PATENT DOCUMENTS

| | | | | |
|---|---|---|---|---|
| 5,526,149 A | * | 6/1996 | Kanbe et al. | 349/113 |
| 6,008,875 A | * | 12/1999 | Ikeno et al. | 349/139 |
| 6,061,111 A | * | 5/2000 | Kataoka et al. | 349/113 |
| 6,219,122 B1 | * | 4/2001 | Uchida et al. | 349/113 |
| 6,233,031 B1 | * | 5/2001 | Ishitaka | 349/113 |
| 6,259,499 B1 | * | 7/2001 | Yamanashi | 349/113 |

* cited by examiner

*Primary Examiner*—Kenneth Parker
(74) *Attorney, Agent, or Firm*—Antonelli, Terry, Stout & Kraus, LLP

(57) ABSTRACT

A reflective color liquid crystal display apparatus, which can obtain bright images with a contrast in when viewed from any direction, is provided at a low cost. The reflective color liquid crystal display apparatus has an inside reflector and is able to produce bright images with a high contrast because unnecessary reflecting light from non-aperture portions can be decreased, and its aperture ratio can be determined approximately only by intervals of the reflective layer and intervals between the transparent electrodes. This can be accomplished by removing a reflective layer corresponding to black a matrix layer, adding a black matrix function to a polymer layer having protrusions and depressions under the reflective layer, and making a composition of its element so that a black matrix layer is not formed on the reflective layer, but only color filters are formed.

8 Claims, 11 Drawing Sheets

FIG. 9(a)
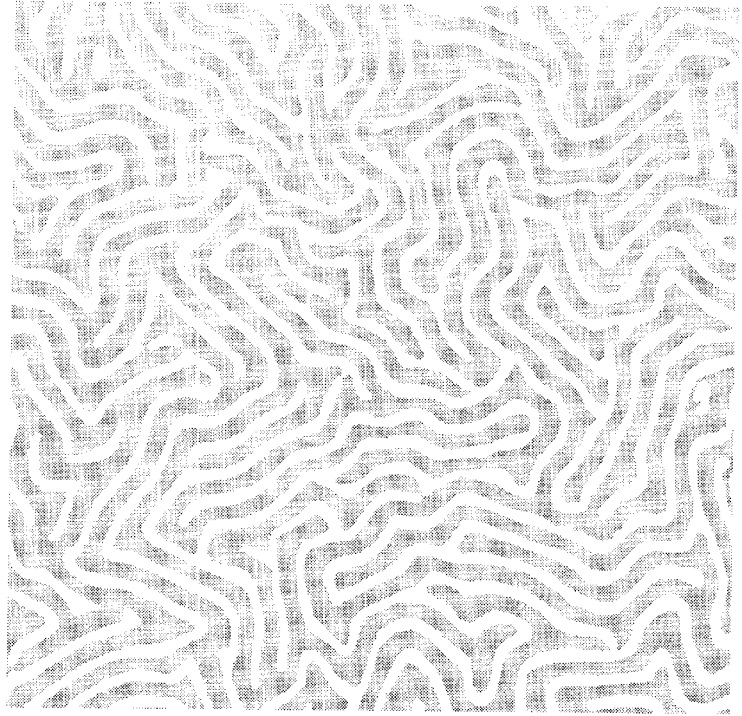
FIG. 9(b)
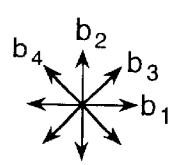
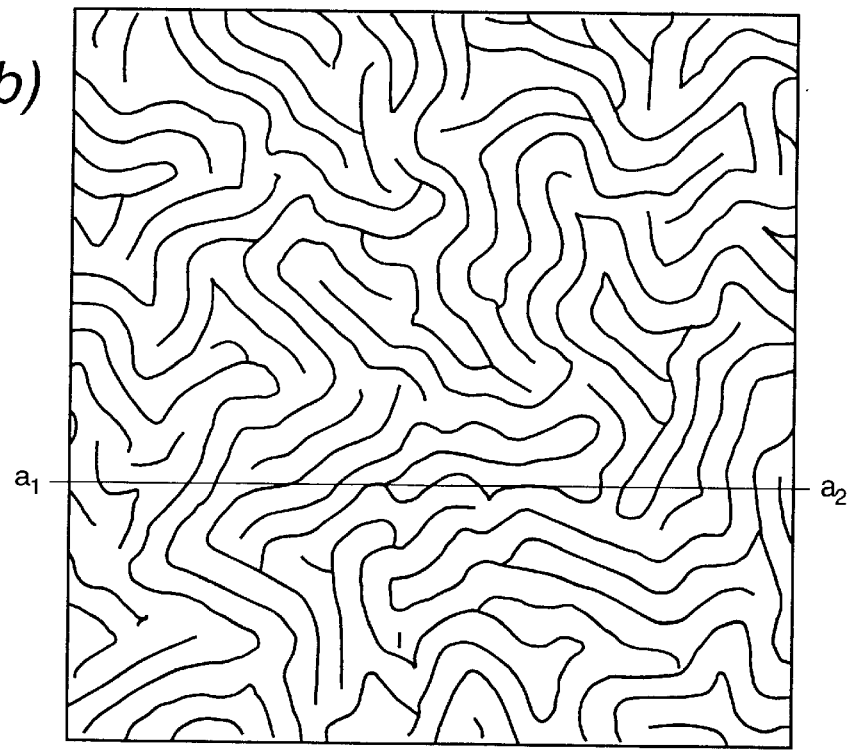

REFLECTIVE COLOR LIQUID CRYSTAL DISPLAY APPARATUS WITH COLORED POLYMER LAYER

BACKGROUND OF THE INVENTION

The present invention relates to a liquid crystal display apparatus, in particular, to a liquid crystal display apparatus provided with an effective function for reflective color displaying.

A conventional reflective color liquid crystal display apparatus, which comprises a reflector provided on many micro-protrusions formed of resin, is disclosed in JP-A-4-243226 (1992). A color filter for reflective color liquid crystal display apparatus is disclosed in JP-A-6-230364 (1994) and others. The color filter does not make any trouble in driving liquid crystal, even if an optical reflector composing a reflector causes an electrical short circuit with transparent electrodes via a defect of color filter, by patterning the reflector to a shape approximately as same as the shape of the color filter.

In accordance with the prior art, a reflector comprising many fine protrusion-depression reflecting planes, whereon circular protrusions or depressions are arranged irregularly so as not to generate optical interference, is disclosed.

Furthermore, as disclosed in JP-A-10-177106 (1998), a liquid crystal display apparatus; wherein liquid crystal element comprises a reflector, which is made to collect incident light in a specified direction by forming circular protrusions or depressions having unsymmetrical distribution of slope angles in their cross section shape; has been proposed.

SUMMARY OF THE INVENTION

In accordance with the prior art described above, any black matrix becomes unnecessary, because the liquid crystal driving does not cause any trouble, even if an optical reflecting film composing a reflector causes an electrical short circuit with transparent electrodes via a defect of color filter, by patterning the reflector to a shape approximately as same as the shape of the color filter, and unnecessary reflection light from unopened portion can be prevented. However, the color filter for reflective color liquid crystal display apparatus had such a problem that contrast was decreased with an element structure having no black matrix layer depending on display mode (for instance, normally open mode), because the color filter for reflective color liquid crystal display apparatus must have spectral characteristics utilizing positively the light in a certain wavelength region, which should be shielded naturally.

Because a liquid crystal layer having an uniform thickness could not be formed with the composition of the prior art described above, wherein only a color filter layer was formed on a surface-roughened reflector, the color filter had additionally such problem that a quality of display (brightness and contrast) was decreased.

In accordance with the prior art, if a leveling layer was provided onto the color filter layer for forming a liquid crystal layer having an uniform thickness, a problem such as decreasing the brightness and others were generated.

The prior art had a problem that display was dark, because, in order to prevent coloring caused by optical interference by arranging circular protrusions or depressions irregularly in a region corresponding to pixel electrode portions, the number of protrusions or depressions, which were reflecting elements for controlling incident light, was decreased significantly from a case when the protrusions or depressions were arranged in a closest packing manner.

In accordance with the prior art, reflected light was collected in a specified direction by making the slope angle distribution of the circular protrusions or depressions unsymmetrical. Therefore, there was a problem such as difficulty in controlling the shape of the fine protrusion or depression, because the manufacturing process became complex.

Furthermore, in accordance with the prior art, fine circular protrusions or depressions were formed by a photolithography method. Therefore, there was a problem such as a high cost, because the manufacturing process was complex, and the number of manufacturing steps was large.

The object of the present invention is to provide a liquid crystal display apparatus comprising a reflector having preferable reflecting characteristics by solving the above described problems, and to provide a manufacturing method thereof.

As a first means for achieving the above object, the reflective color liquid crystal display apparatus of the present invention uses the following liquid crystal display element:

The liquid crystal display element comprises an electrode substrate: wherein a reflector composed of a metal such as aluminum, silver, and others, is formed on many fine protrusions and depressions formed with a resin, wherein a black pigment having light shielding function is dispersed, on a glass substrate corresponding to apertures: color filters of red, green, and blue having leveling function are formed on the reflector; and transparent electrodes and alignment layer are formed on the color filters: and another electrode substrate: wherein transparent electrodes and alignment layer are formed on a glass substrate: the liquid crystal display element is manufactured by matching the electrode substrates via a spacing material for defining thickness of the liquid crystal so that each of the alignment layers are faced each other, filling liquid crystal into the interval between the electrode substrates by any method such as vacuum filling method and the like, and sealing the interval.

As a second means for achieving the above object, the reflective color liquid crystal display apparatus of the present invention is a reflective color liquid crystal display apparatus comprising a reflector composed by laminating a polymer layer having protrusions and depressions and a reflective layer onto a glass substrate: the reflector comprises the polymer layer, whereon fine protrusion-depression planes are formed by the following method and the like in order to achieve the above object:

1) string shaped protrusions having smooth curves, or string shaped depressions are arranged continuously and alternately,
2) string shaped protrusions having smooth curve are arranged continuously, and
3) string shaped depressions having smooth curve are arranged continuously.

In accordance with the reflector of the reflective liquid crystal display apparatus of the present invention, fine protrusion-depression planes are formed on the polymer layer by arranging the string shaped protrusions or the string shaped depressions in a manner that the slope angle distribution of the cross section shapes of the depressions and depressions in a direction at a right angle to the longitudinal direction is approximately symmetrical from right and left, and total lengths of the respective string shaped protrusions or string shaped depressions in respective directions are approximately equal.

In accordance with the reflector of the reflective liquid crystal display apparatus of the present invention, fine protrusion-depression planes are formed on the polymer layer by arranging the string shaped protrusions or the string shaped depressions in a manner that the slope angle distribution of the cross section shapes of the depressions and depressions in a direction at a right angle to the longitudinal direction is approximately symmetrical from right and left, and total lengths of the respective string shaped protrusions or string shaped depressions in respective directions differ each other.

The reflective liquid crystal display apparatus of the present invention is featured in having an element structure; wherein an electrode substrate comprising a polymer layer, which comprises the fine protrusion-depression planes composed of the string shaped protrusions and string shaped depressions, a reflective layer, an insulating layer, transparent electrodes, and an alignment layer laminated on a glass substrate; and another electrode substrate comprising a black matrix layer, color filters, a leveling layer, transparent electrodes, and an alignment layer are laminated on a glass substrate; are arranged so that the transparent electrodes of the above respective electrode substrates are faced each other via the liquid crystal.

The reflective liquid crystal display apparatus of the present invention is featured in having an element structure; wherein an electrode substrate comprising polymer layers, wherein black pigment and the like is dispersed, comprising fine protrusion-depression planes composed of the string shaped protrusions and string shaped depressions, rectangular reflective layers arranged only at portions corresponding to the pixels, color filters, leveling layers, transparent electrodes, and alignment layers laminated on a glass substrate; and another electrode substrate comprising transparent electrodes, and alignment layers are laminated on a glass substrate; are arranged so that the transparent electrodes of the above respective electrode substrates are faced each other via the liquid crystal.

The reflective liquid crystal display apparatus of the present invention is featured in forming the protrusion-depression pattern composed of the protrusions or depressions by a simulation method of phase separation pattern generation by spinodal decomposition, and the protrusion-depression pattern is used as a black matrix pattern for a photo mask used in forming the polymer layer, or a master pattern for protrusion-depression pattern formed in a transcription die.

In accordance with the reflective liquid crystal display apparatus of the present invention, the simulation method for pattern generation by spinodal decomposition is a numerical simulation using:
1) Cahn-Hilliard-Cook equation,
2) Time dependent Ginzburg-Landau equation,
3) Cell-Dynamical-System equation, and others.

In accordance with the reflective liquid crystal display apparatus of the present invention, a pattern of the black matrix portion or a pattern of transparent portion for the photo mask used in forming the reflector is any of the pattern generated by simulation of the spinodal decomposition, or a pattern obtained by image processing of the pattern generated by simulation of the spinodal decomposition and taken into a computer and the like.

In accordance with the reflective liquid crystal display apparatus of the present invention, the pattern generated by the simulation method is any one of pattern indicating reflecting characteristics uniform to all directions, or pattern indicating such reflecting characteristics that incident light is collected in a specified direction.

In accordance with the reflective liquid crystal display apparatus of the present invention, following liquid crystal display elements are used: the liquid crystal display element comprises; a reflective electrode substrate composed by laminating a reflector formed on a polymer layer comprising smooth protrusion-depression planes composed of string shaped pattern, which can be arranged in a closest packing manner, an insulating layer, plural transparent electrodes, an alignment layer on one side of a glass substrate; a color filter substrate composed by laminating a black matrix layer, color filters, a leveling layer, plural transparent electrodes, and an alignment layer on one side of another glass substrate; and liquid crystal filled in an interval between the reflective electrode substrate and the color filter substrate.

A method for manufacturing the reflective liquid crystal display apparatus of the present invention comprises: a method of forming a reflection electrode substrate comprising the steps of; applying a photosensitive resin onto a glass substrate, forming a polymer layer comprising smooth protrusion-depression planes composed of string shaped protrusions and string shaped depressions using a transcription casting roll, or a template, and the like having the protrusions and depressions satisfying the above conditions; forming a reflective layer onto the polymer layer, forming an insulating layer onto the reflective layer, forming transparent electrodes onto the insulating layer, and forming an alignment layer onto the transparent electrodes: a method of forming color fiter substrate comprising the steps of; forming a black matrix layer onto one side of the other glass substrate, forming color filters onto the black matrix layer, forming a leveling layer onto the color filter, forming transparent electrodes onto the leveling layer, and forming an alignment layer onto the transparent electrodes: and a step of filling liquid crystal into an interval between the reflection electrode substrate and the color filter substrate, and sealing the interval.

Furthermore, the method for manufacturing the reflective liquid crystal display apparatus of the present invention is a method for manufacturing a reflective liquid crystal display apparatus comprising a reflector composed of a reflector formed on a glass substrate, whereon a polymer layer comprising smooth protrusion-depression planes satisfying the following conditions have been formed;

1) string shaped pattern having smooth curves,
2) a pattern wherein the string shaped protrusions and string shaped depressions are arranged so that the protrusions and depressions are arranged continuously, or the protrusions or the depressions are arranged continuously,
3) a pattern wherein sums of total length components in any directions of the protrusions and that of the depressions are approximately equal, or sums of total length components in respective directions of the protrusions and that of the depressions are different each other.

The method for manufacturing a reflective liquid crystal display apparatus comprises a method of manufacturing a liquid crystal display element, which comprises a method of forming a reflection electrode substrate comprising the steps of; applying a photosensitive resin onto a side of the glass substrate composing the reflector to form a polymer layer comprising smooth protrusion-depression planes by patterning the polymer layer with a transcription casting roll, or a template, and the like, whereon the pattern is formed to satisfy the above conditions; shaping the polymer layer comprising the protrusion-depression planes to smooth protrusion-depression planes by irradiating light or heat treating the substrate; forming a reflective layer onto the polymer layer comprising the smooth protrusion-depression planes; forming a leveling layer onto the reflective layer, forming plural transparent electrodes onto the leveling layer, and forming an alignment layer onto the transparent electrodes: a method of forming a color filter substrate comprising the steps of; forming a black matrix layer onto another glass substrate, forming color layers onto the black matrix layer, forming a leveling layer onto the coloring layers, forming plural transparent electrodes onto the leveling layer, and forming an alignment layer onto the transparent electrodes: and a method comprising the steps of facing respective of alignment layer each other, and a step of filling liquid crystal into an interval between the reflection electrode substrate and the color filter substrate, and sealing the interval. The method for manufacturing a reflective liquid crystal display apparatus further comprises the steps of adhering a designated phase plate and polarizer on the plane of the glass substrate other than the plane whereon the color filters of the liquid crystal display element is formed, connecting tape carrier package (hereinafter called TCP), whereon an IC for driving the liquid crystal is mounted, and an external circuit for driving to the liquid crystal display element, and assembling the liquid crystal display element into a frame, case, and the like.

Another method for manufacturing a reflective liquid crystal display apparatus is a method for manufacturing a reflective liquid crystal display apparatus having a reflector, wherein a reflector is formed on a glass substrate having many fine protrusions or depressions formed thereon. The method comprises a method of manufacturing a liquid crystal display element. The method of manufacturing a liquid crystal display element comprises: a method of forming a reflection electrode substrate comprising the steps of; applying a photosensitive resin onto a side of the glass substrate composing the reflector, subsequently forming a polymer layer comprising smooth protrusion-depression planes, whereon string shaped protrusions and string shaped depressions are arranged continuously and alternately, by patterning the polymer layer by heat treatment after exposing and developing the photosensitive resin via a light shielding means, wherein the pattern is formed using a simulation of spinodal decomposition so that the string shaped pattern comprises smooth curves having an uniform width and a designated length component in black matrix region or transparent region, and sum of the length components in the black matrix region or transparent region become approximately equal each other in respective directions; forming a reflective film on the polymer layer having the protrusion-depression planes, forming a leveling layer on the reflective layer, and forming plural transparent electrodes on the leveling layer: a method of forming a color filter substrate comprising the steps of; forming a black matrix layer onto another glass substrate, forming color filters onto the black matrix layer, forming a leveling layer onto the color filters, and forming plural transparent electrodes onto the leveling layer: and a method comprising the steps of facing respective of transparent electrodes each other, and a step of filling liquid crystal into an interval between the reflection electrode substrate and the color filter substrate, and sealing the interval. The method for manufacturing a reflective liquid crystal display apparatus is completed by adding further the steps of adhering a designated phase plate and polarizer on the plane of the glass substrate other than the plane whereon the color filters of the liquid crystal display element are formed, connecting TCP, whereon an IC for driving the liquid crystal is mounted, and an external driving circuit to the liquid crystal display element, and assembling the liquid crystal display element into a frame, case, and the like.

BRIEF DESCRIPTION OF THE DRAWINGS

FIG. 9 is an illustration indicating a photo mask pattern for forming protrusions and depressions composed of string shaped protrusions and string shaped depressions and a diffusion reflector.

DETAILED DESCRIPTION OF THE EMBODIMENTS

Figure 1:
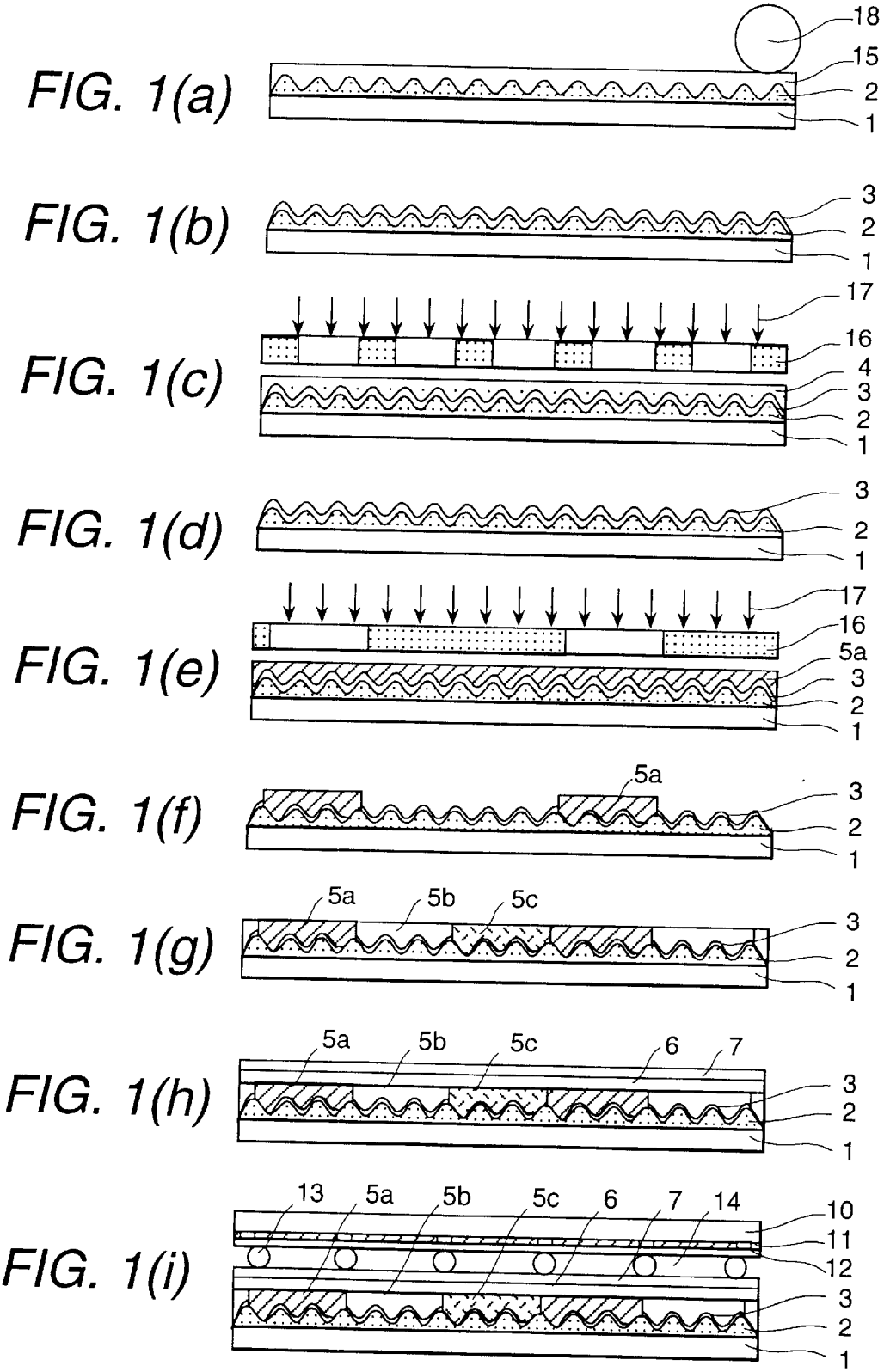
FIG. 1 is a set of schematic cross sections indicating manufacturing steps of the reflective color liquid crystal display element of the embodiment 1.

An example of composing an element of the reflective color liquid crystal display apparatus practically by arranging color filters (red, green, blue, or cyan, magenta, yellow) having leveling function onto a diffusion reflector provided inside; wherein a plurality of reflectors obtained by patterning each of pixel electrodes onto a polymer layer forming protrusion and depression having a shielding function of the present invention are laminated; is as follows:

(1) A manufacturing step of applying a photosensitive resin or a thermosetting resin onto a polymer base film, whereon many micro-protrusions and depressions are provided randomly (pitch: 10–30 μm, height or depth: 0.5–2.0 μm), drying to obtaining a transcription film, and adhering the thin film made of the photosensitive resin or the thermosetting resin to a glass substrate by heating (50–150° C.) and pressurizing (1–12 kg/cm$^2$) with a laminator and the like from the upper surface of the supporter, i.e. the polymer base film, using the transcription film.

(2) A manufacturing step of peeling off the polymer base film, i.e. the supporter.

(3) A manufacturing step of forming a reflector (a thin film of aluminum, silver, and the like, film thickness: 100–300 nm) onto a thin polymer layer having the previously described protrusions and depressions, wherein a black pigment is dispersed.

(4) A manufacturing step of patterning (removing portions of the reflector corresponding to non-aperture portion) the reflector corresponding to respective of pixel electrodes.

(5) A manufacturing step of forming color filters (red, green, blue, or cyan, magenta, yellow, film thickness: 1.0–5.0 μm) having leveling function onto the reflector.

(6) A manufacturing step of forming transparent electrodes (ITO (Indium Tin Oxide), film thickness: 100–300 nm) onto the color filters.

(7) A manufacturing step of forming alignment layer (polyimide, film thickness: 50–150 nm) onto the transparent electrode for composing an electrode substrate.

(8) A manufacturing step of forming transparent electrodes onto a glass substrate for composing another electrode substrate.

(9) The another electrode substrate, composed by the manufacturing step of forming alignment layer (polyimide, film thickness: 50–150 nm) onto the transparent electrode of the step (8), and

(10) the electrode substrate, composed by the manufacturing step (7) of forming alignment layer (polyimide, film thickness: 50–150 nm) onto the transparent electrode,

(11) are matched so that the alignment layer of respective planes faces each other via a spacing material (polymer beads, silica beads, glass fiber, particle size: 6 μm), adhered surrounding of the both electrode substrates with a sealing material (epoxy resin wherein the above spacing material is dispersed), and sealed in this step.

(12) A manufacturing step of preparing the liquid crystal display element by filling the liquid crystal into the interval between the both electrode substrates, and sealing.

And, the liquid crystal display apparatus of the present invention is completed by the following steps:

(13) A manufacturing step of adhering designated phase plate and polarizer to surface of the glass substrate, whereon only the transparent electrode is formed, of the liquid crystal display element.

(14) A manufacturing step of connecting a TCP, whereon an IC for driving liquid crystal is mounted, and an external driving circuit to the liquid crystal display element.

(15) A manufacturing step of assembling the liquid crystal display element to a case, or frame, and the like.

Thus, the liquid crystal display apparatus of the present invention is completed.

In accordance with the present invention, (1) Reflective color liquid crystal display apparatus, which can display images of bright and high contrast, can be provided, because reflection light from non-aperture portion can be decreased significantly by providing black matrix function to the diffusion base layer (a polymer layer with protrusions and depressions) by dispersing black pigment and the like, and arranging the reflector laminated on the diffusion base layer only at a portion corresponding to the aperture.

(2) Reflective color liquid crystal display apparatus, which can display bright and high contrast images, can be provided with a low price, because black matrix can be omitted by providing the black matrix function to the diffusion base layer (a polymer layer with protrusions and depressions), and arranging the reflector only at aperture portion.

(3) Reflective color liquid crystal display apparatus, which can display bright and high contrast images, can be provided with a low price, because the leveling layer can be omitted by providing leveling function for eliminating steps of the diffusion reflector to the color filter by forming the color filter with a printing method, or a transcription method and the like.

(4) Reflective color liquid crystal display apparatus of low cost can be provided, because the number of composing materials of the element can be decreased by providing the black matrix function to the diffusion base layer and the leveling function to the color filter, respectively.

The resin materials using for the diffusion base layer (a polymer layer with protrusions and depressions) can be selected arbitrarily corresponding to its usage from any of photosensitive resin and non-photosensitive resin.

Then, a reflective liquid crystal display element preferable for performing the present invention is explained hereinafter. In accordance with the present invention, a reflective super twisted nematic mode color liquid crystal apparatus (hereinafter, called a reflective STN color liquid crystal display apparatus), which is used for hand held type personal computers corresponding to ½ VGA of display scale 640× 240 dots (picture element pitch: 0.3 mm×0.3 mm, pixel size: 0.288 mm×0.288 mm, plane diagonal size: 8.1 inches) or out side purposes, is mainly explained.

However, the present invention does not depend on driving types of the liquid crystal, and the present invention is not restricted to the STN mode liquid crystal display type, because it is applicable to any of active addressing type, and passive type.

Embodiment 1

An example of manufacturing method of the reflective color liquid crystal display element relating to the present invention is explained referring to a set of schematic cross sections indicated in FIG. 1.

Manufacturing step (a): A transcription film is prepared by coating a high polymer base film 15, whereon many depressions have been formed at its surface (polyethylene terephthalate, film thickness: 50 μm, depression pitch: approximately 15 μm, depth of the depression: 1.2 μm) with a black pigment dispersed polymer layer 2 (film thickness: 1.5 μm) composed of acrylic resin (either of epoxy group resin or amido group resin is usable, the black pigment dispersed polymer layer 2 can be either of photosensitive resin or non-photosensitive resin), wherein a black pigment, carbon, or the like is dispersed, drying the film, and subsequently, adhering a cover film (not shown in the figure, polyethylene, film thickness: 6 μm) on the black pigment dispersed polymer layer 2.

The transcription film is transferred onto a glass substrate 1 (soda glass, thickness: 0.7 mm) using a laminator 18 (temperature of the substrate: 100° C., roll pressure: 6 kg/cm², moving velocity: 0.5 m/minute). Subsequently, main curing is performed (100° C./30 minutes), and the black pigment dispersed polymer layer 2 having many depressions is formed by peeling off the high polymer base film.

Manufacturing step (b): A reflector 3 made of aluminum (silver is usable, film thickness: 100 nm) is formed on the black pigment dispersed polymer layer 2 having many depressions.

Manufacturing step (c): After forming a photosensitive polymer layer 4 (film thickness: 1.5 µm) on the reflector 3, the photosensitive polymer layer 4 is exposed to ultraviolet ray 17 via a photo mask 16.

Manufacturing step (d): The photosensitive polymer layer 4 is developed with a designated developing condition to remove the reflector 3 at portions corresponding to intervals between electrodes and black matrix layer, and to form the reflector 3 (size: 288 µm×88 µm, interval: 12 µm) at portions (rectangular shapes) corresponding to only apertures.

Manufacturing step (e): Non-photosensitive color filters 5a, 5b, 5c (film thickness: 2.0 µm) are formed on the reflector 3 being patterned as rectangular shapes by an intaglio printing method so as to level the protrusion and depression on the surface of the reflector 3.

Manufacturing step (f): The non-photosensitive color filters 5a, 5b, 5c are cured by a designated condition to form color filters of red, green, and blue (yellow, cyan, and magenta are usable) 5a, 5b, 5c.

Manufacturing step (g): A transparent electrode 6 (ITO, film thickness: 260 nm, scanning electrodes of; number of the electrode: 240, electrode pitch: 300 µm, electrode width: 292 µm, interval between the electrodes: 8 µm), and alignment layer (polyimide group, film thickness: 70 nm) are formed on color filters 5a, 5b, 5c.

Manufacturing step (h): An electrode substrate formed by the above manufacturing steps (a) to (g), and another electrode substrate, which was manufactured by forming transparent electrodes 11 (ITO film, film thickness: 260 nm, signal electrode of; number of the electrode: 1920, electrode pitch: 100 µm, electrode width: 92 µm, interval between the electrodes: 8 µm), and alignment layer 12 (polyimide group, film thickness: 700 nm) are formed on a glass substrate 10 (soda glass, plate thickness: 0.7 mm), are arranged so that the transparent electrodes 6, 11 of the electrode substrates are faced each other, and assembled via a spacer 13 (particle size: 6 µm) made of polymer beads equivalent to the thickness of the liquid crystal layer 14.

Then, the two electrode substrates are sealed with sealing material, which are made of epoxy resin mixed with polymer beads (silica beads are also usable) and formed at periphery of the substrates, and a reflective color liquid crystal display element was prepared by filling the interval between the electrode substrates with a liquid crystal 14 (a liquid crystal composition made of cyano PCH and a transfer derivative, refractive index anisotropy Δn: 0.133, twisted angle: 250°), and sealing the interval (with photosensitive acrylic resin or photosensitive epoxy resin).

Figure 2:
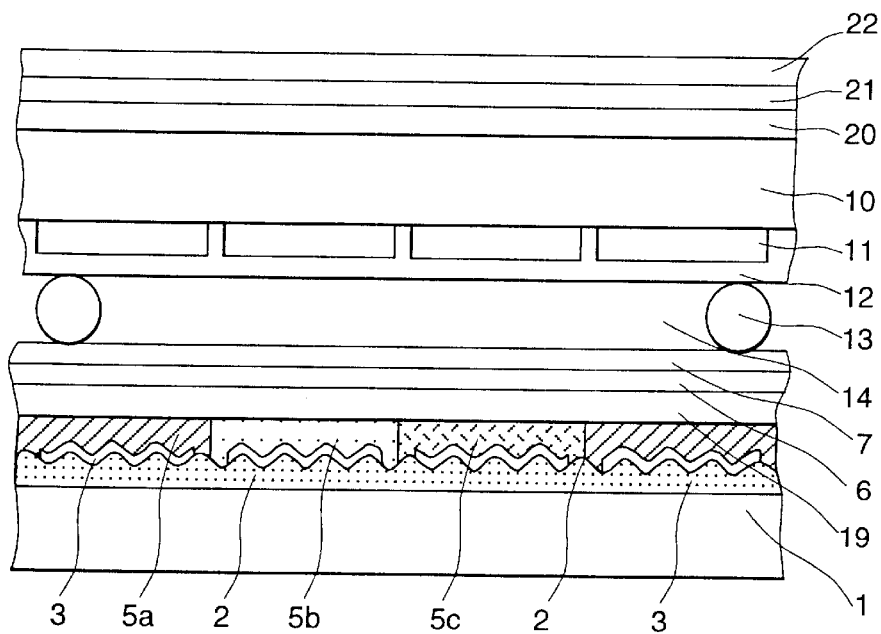
FIG. 2 is a schematic cross section indicating composition of the reflective color liquid crystal display element of the embodiment 1.

Furthermore, the reflective color liquid crystal display element was manufactured by arranging designated phase plates 20, 21, and a polarizer 22 on the glass substrate of the above reflective color liquid crystal display element, as indicated in FIG. 2.

Figure 3:
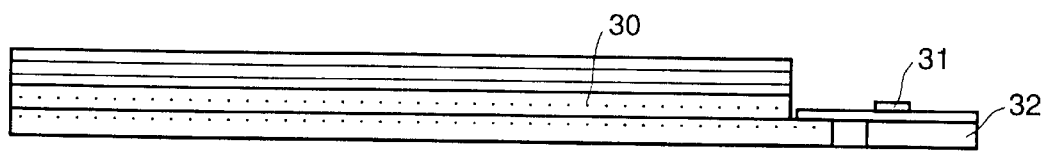
FIG. 3 is a schematic cross section indicating composition of the reflective color liquid crystal display apparatus of the present invention.

Furthermore, as indicated in FIG. 3, a reflective color liquid crystal display apparatus was manufactured by mounting a printed substrate provided with a tape carrier package 31 mounting IC for driving the liquid crystal, power supply circuits, control circuits, and others on the above ref lective color liquid crystal display element 30.

Figure 4:
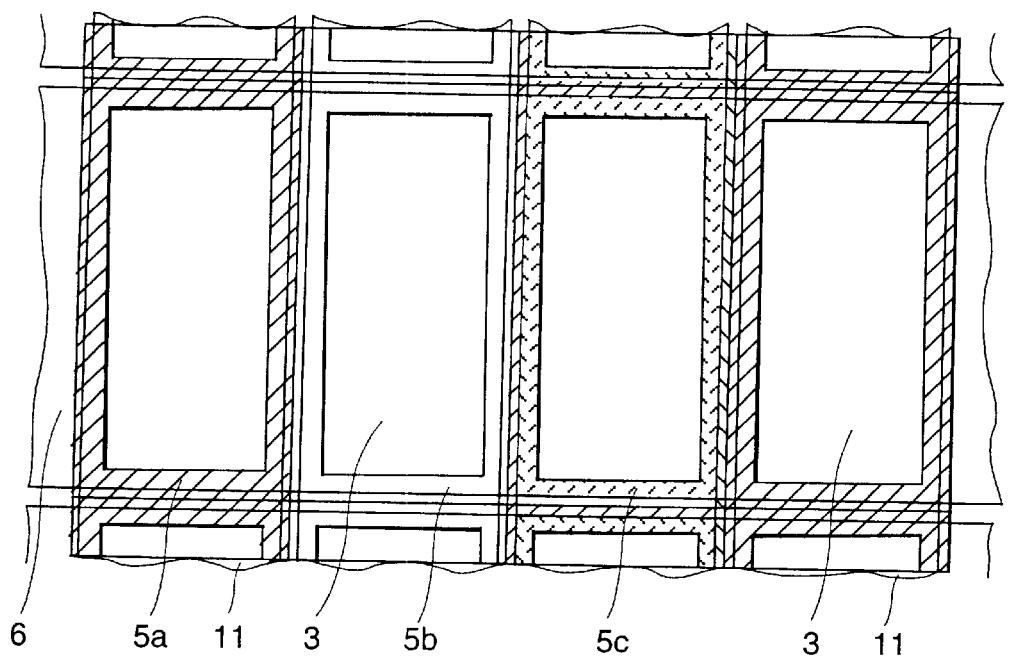
FIG. 4 is a schematic plan view indicating details of pixel portion of the reflective color liquid crystal display element of the embodiment 1.

Next, a relationship among the reflector 3, color filters 5a, 5b, 5c, and transparent electrodes 6, 11 in the ref lective color liquid crystal display element of the present invention is indicated in FIG. 4. As indicated in FIG. 4, the reflectors at the portion corresponding to the intervals between the transparent electrodes 6, 11 are removed, and color filters laminated at the portions where the reflectors are removed. Therefore, an advantage to make high contrast display becomes possible can be realized, because unnecessary incident light can be absorbed by not only the color filters, but also the black pigment dispersed polymer layer 2, which is a base layer of the diffusion reflector, and unnecessary incident light from non-aperture portions can be eliminated even if the structure does not have the black matrix layer.

In a relationship between the reflector and the transparent electrodes, the interval between the reflective films is set somewhat wider than the interval between the transparent electrodes as indicated in FIG. 4. This setting is advantageous in image quality such as brightness, contrast, and others.

In accordance with the present embodiment, the black pigment dispersed polymer layer as the base layer for the diffusion reflector was formed by arranging many fine protruded (semi-spherical) resins of approximately 15 µm in diameter and 1.2 µm high so as not to generate optical interference, and forming an aluminum film of 100 nm thick thereon. However, material, shape, size, and others of the protruded resin can be selected depending on its object.

In accordance with the present embodiment, a reflective color liquid crystal display apparatus, whereby images which are bright from all the directions and of high contrast can be obtained, can be provided, because unnecessary reflecting light from the non-aperture portions can be eliminated by not only the reflective film on the black pigment dispersed polymer layer, i.e. the base layer of the diffusion reflector formed only at the apertures, but also by the black pigment dispersed polymer layer, i.e. the base layer of the diffusion reflector, which absorbs incident light at the non-aperture portions.

In particular, the element can be composed so that the aperture, which determines the brightness, can be controlled approximately by preciseness of patterning only the reflective film and transparent electrodes, of which patterning can relatively be made readily. Therefore, the reflective color liquid crystal display apparatus, which realizes bright images from all the directions and images of high contrast, can be provided.

In accordance with forming the reflector and the color filters on a same glass substrate, an advantage to improve the production yield of the transparent electrodes can be realized, because signal electrodes requiring a high preciseness corresponding to the color filters can be formed directly on the glass substrate of another electrode substrate.

In particular, in accordance with the present embodiment, the color filters 5a, 5b, 5c having flat surface can be formed by forming the color filters 5a, 5b, 5c on the diffusion reflector having large protrusions and depressions by a printing method or a transcription method. Therefore, not only the leveling layer becomes unnecessary, but also advantages such that the reflective color liquid crystal display apparatus, which obtains bright and high contrast images, can be provided with a low cost.

Further, because signal electrodes having a narrow electrode width and a small electrodes pitch can be formed directly onto the glass substrate, mounting and correcting TCP provided with IC for liquid crystal driving are easy, and an advantage to improve the production yield of the liquid crystal element can be achieved.

Furthermore, the manufacturing steps can be decreased significantly by using transcription film, whereon the reflector and polymer layer are laminated sequentially onto a polymer base film having fine protrusions-depressions.

Particularly, the reflective color liquid crystal display apparatus, which obtains uniform and bright images all over the display plane and high contrast images, can be provided with a low cost by forming the color filters with a printing method, which is able to print three colors of red, green, and blue simultaneously by one step, because the color filters with flat surface, which operates as the same function as the leveling layer, can be formed.

Although it is not shown in the figure, the leveling layer may be provided between the reflector 3 and the color filters 5a, 5b, 5c, or between the color filters 5a, 5b, 5c, and the transparent electrodes 6.

In accordance with the present embodiment, the diffusion reflector and the color filters were formed on the same substrate, but in a case when the diffusion reflector and the color filters were formed on different substrates each other, the same characteristics as the present embodiment can be obtained, even though the brightness is decreased somewhat.

Embodiment 2

Next, an example of other reflective color liquid crystal display element of the present invention is explained hereinafter referring to a schematic cross section of FIG. 5.

Figure 5:
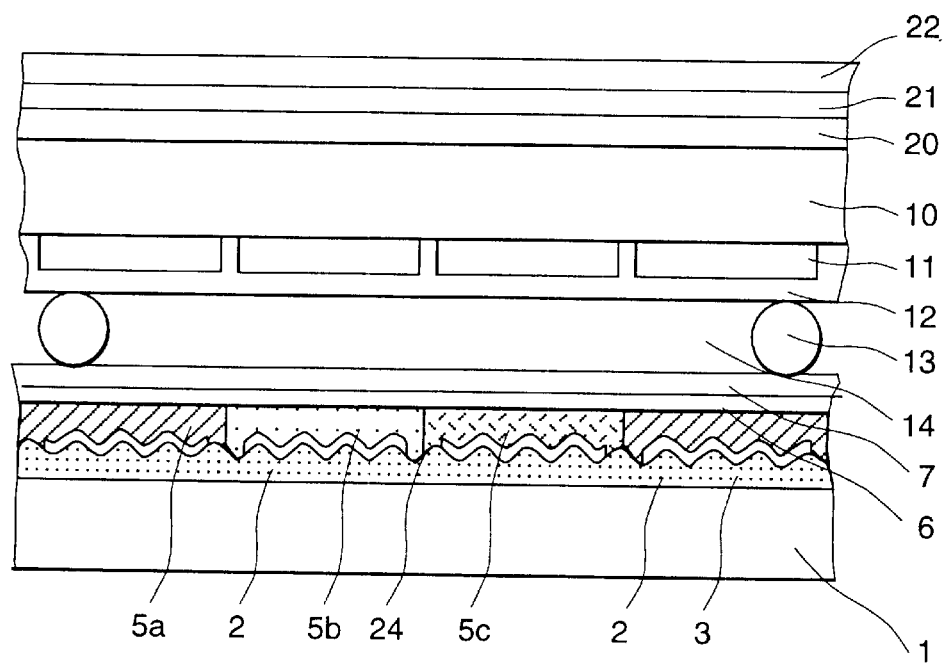
FIG. 5 is a schematic cross section indicating composition of the reflective color liquid crystal display element of the embodiment 2.

As indicated in FIG. 5, the reflective liquid crystal display apparatus was provided with a reflective liquid crystal display element, which was prepared as follows: an electrode substrate, wherein a polymer layer 2 comprising many protrusions (resin: acrylic, protrusion pitch: approximately 15 μm, height: 1.2 μm), a reflective layer 3 (silver, film thickness: 100 nm), black matrix layer 24 (silver, film thickness: 100 μm, blackening treatment: sulfide treatment, pitch: 300 μm ×100 μm, width: 12 μm), color filters 5a, 5b, 5c (pigment type, film thickness: 3.0 μm, width: 100 μm), transparent electrode 6 (ITO film, film thickness: 260 nm, width of electrode: 292 μm, interval between electrodes: 8 μm), and alignment layer (polyimide, film thickness: 100 nm), were laminated on a glass substrate 1 (soda glass, plate thickness: 0.7 mm): and another electrode substrate, wherein transparent electrodes 11 (ITO film, film thickness: 260 nm, electrode width: 92 μm, interval between electrodes: 8 μm), and alignment layer (polyimide, film thickness: 100 nm) were laminated on a glass substrate 10 (soda glass, plate thickness: 0.7 mm): the above described two electrode substrates were matched via spacer material 13 of polymer beads (particle size: 8 μm), and liquid crystal 14 (a liquid crystal composition composed of cyano PCH and a transfer derivative, liquid crystal thickness: 6 μm, twisted angle: 250°) was filled into the interval between the two electrode substrates: subsequently, a designated optical scattering plate 23, phase plates 20, 21, and a polarizer were provided onto one of the glass substrate 10 of the reflective liquid crystal display element.

In accordance with the present embodiment, the reflector at portions corresponding to the black matrix layer was blackened by sulfide treatment so as not to generate unnecessary steps on surface of the reflector and to give a black matrix function to the non-aperture portions. It is advantageous in leveling surface of the color filters 5a, 5b, 5c, and a reflective color liquid crystal display apparatus, which can display bright and high contrast images, can be provided.

In accordance with the present embodiment, the signal electrodes requiring a high preciseness can be formed directly on the one glass substrate, because the polymer layer, i.e. a base layer of the diffusion reflector, the reflector, and the color filters were gathered to another glass substrate. Therefore, an advantage to improve the production yield of the liquid crystal display element can be realized.

Furthermore, mounting and correcting TCP provided with IC for driving liquid crystal are easy, and an advantage to improve the production yield of the liquid crystal element can be achieved.

In accordance with the present embodiment, a silver film, of which thickness was 100 nm, was used as the reflector, and the portions corresponding to the black matrix layer was blackened by sulfide treatment to give a black matrix function. However, the material of the reflector, blackening treatment, and others can be selected based on its object.

Although it is not shown in the figure, the leveling layer may be provided between the reflector 3 and the color filters 5a, 5b, 5c, or between the color filters 5a, 5b, 5c, and the transparent electrodes 6.

In accordance with the present embodiment, the diffusion reflector and the color filters were formed on the same substrate, but in a case when the diffusion reflector and the color filters were formed on different substrates each other, the same characteristics as the present embodiment can be obtained, even though the brightness is decreased somewhat.

Embodiment 3

Figure 6:
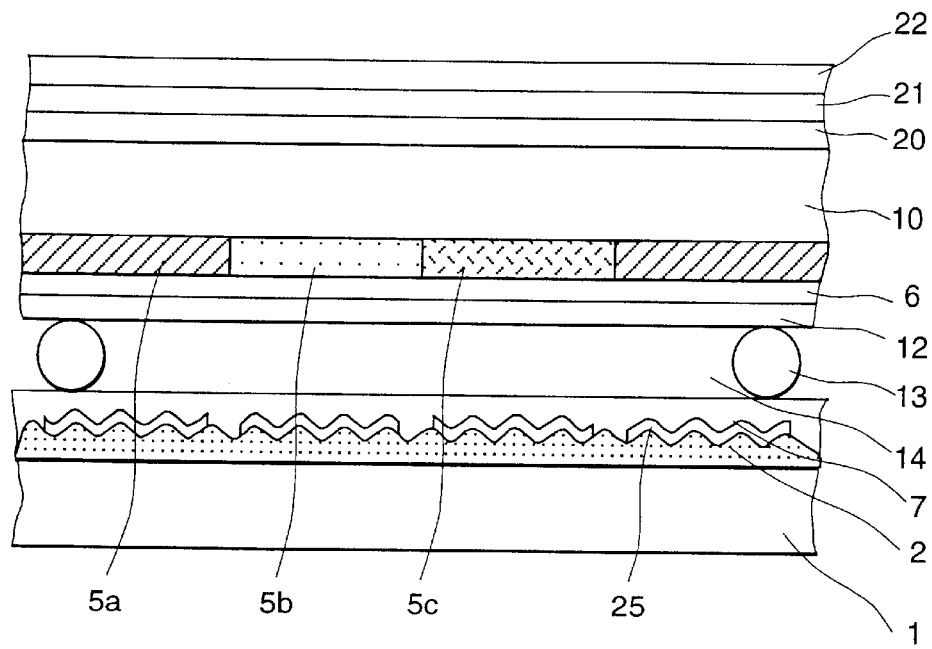
FIG. 6 is a schematic cross section indicating composition of the reflective color liquid crystal display element of the embodiment 3.

Next, an example of other reflective color liquid crystal display element of the present invention is explained hereinafter referring to a schematic cross section of FIG. 6.

Manufacturing step (a): A transcription film is prepared by coating a polymer base film 15, whereon many depressions have been formed at its surface, (polyethylene terephthalate, film thickness: 50 μm, depression pitch: approximately 15 μm, depth of the depression: 1.2 μm) with a black pigment dispersed polymer layer 2 (film thickness: 1.5 μm) composed of acrylic resin (either of epoxy group resin or amido group resin is usable, the black pigment dispersed polymer layer 2 can be either of photosensitive resin or non-photosensitive resin), wherein a black pigment, carbon, or the like is dispersed, drying the film, and subsequently, adhering a cover film (not shown in the figure, polyethylene, film thickness: 6 μm) on the black pigment dispersed polymer layer 2.

The transcription film is transferred onto a glass substrate 1 (soda glass, thickness: 0.7 mm) using a laminator 18 (temperature of the substrate: 100° C., roll temperature: 100° C., roll pressure: 6 kg/cm$^2$, moving velocity: 0.5 m/minute). Subsequently, main curing is performed (240° C./30 minutes), and the black pigment dispersed polymer layer 2 having many depressions is formed by peeling off the polymer base film.

Manufacturing step (b): A reflector 3 made of aluminum (silver is usable, film thickness: 100 nm) is formed on the black pigment dispersed polymer layer 2 having many depressions.

Manufacturing step (c): After forming a photosensitive polymer layer 4 (film thickness: 1.5 μm) on the reflector layer 3, the photosensitive polymer layer 4 is exposed to ultraviolet ray 17 via a photo mask 16.

Manufacturing step (d): The photosensitive polymer layer 4 is developed with a designated developing condition to form the electrodes and reflective layer 25 (electrodes and reflector pitch: 100 μm, electrodes and reflector width: 88 μm, electrodes and reflector interval: 12 μm) at portions corresponding to the color filters.

Manufacturing step (e): The alignment layer 7 (polyimide, film thickness: 70 nm) having a leveling function for solving the protrusions and depressions on the surface of the electrode and reflective layer 25 is formed on the electrode and reflective layer 25.

Manufacturing step (f): Any one of the color filters 5a (film thickness: 1.2 μm) of red, green, and blue (yellow, cyan, and magenta are usable) is formed on one of the electrode substrates formed by the above manufacturing steps (a)–(e), and the glass substrate 10 (soda glass, plate thickness: 0.7 mm) by developing the photosensitive color filters 5a with a designated condition.

Manufacturing step (g): The color filters 5b (film thickness: 1.2 μm) and 5c (film thickness: 1.2 μm) are formed by repeating the same manufacturing steps as the coloring layer 5a.

Manufacturing step (h): The other electrode substrate, wherein the transparent electrode 6 (ITO, scanning electrodes of: film thickness: 260 nm, number of the electrode: 240, electrode pitch: 300 μm, electrode width: 288 μm, interval between the electrodes: 12 μm), and the alignment layer 12 (polyimide group, film thickness: 70 nm) were formed on the color filters 5a, 5b, 5c, was arranged so that the respective transparent electrodes 6, 11 were faced each other, and the above described two electrode substrates were matched via spacer material 13 of polymer beads (particle size: 6 μm) having a size equivalent to the thickness of the liquid crystal layer 14.

Then, both of the electrode substrates were sealed with a sealing agent, which was composed of an epoxy resin formed at periphery of the substrates mixed with polymer beads (silica beads is usable), the liquid crystal 14 (a liquid crystal composition composed of cyano PCH and a transfer derivative, refractive index anisotropy Δn: 0.133, twisted angle: 250°) was filled into the interval between the two electrode substrates: and sealed (photosensitive acrylic resin or photosensitive epoxy resin) to prepare the reflective color liquid crystal display element.

Subsequently, a designated phase plates 20, 21, and a polarizer 22 were provided onto the glass substrate 10 of the reflective liquid crystal display element.

Furthermore, as indicated in FIG. 3, a reflective color liquid crystal display apparatus was manufactured by mounting a printed substrate provided with a tape carrier package mounting IC for driving the liquid crystal, power supply circuits, control circuits, and others on the above reflective color liquid crystal display element.

In accordance with the present embodiment, a reflective color liquid crystal display apparatus, which can display bright and high contrast images, can be provided with a low cost, because the black matrix layer was made unnecessary by patterning the reflector to operate as both the electrode and the reflector at the same time, and making the polymer layer, which was a base layer of the diffusion reflector, had a black matrix function.

In particular, the element can be composed so that the aperture, which determines the brightness, can be decided approximately by preciseness of patterning of only the transparent electrodes and the electrode and reflector, of which patterning can be performed relatively easy.

Therefore, the reflective color liquid crystal display apparatus, which can display bright and high contrast images, can be provided.

Any leveling layer was formed between the color filters 5a, 5b, 5c and the transparent electrodes 6, or between the electrode and reflector 25, and the alignment layer 7. However, adoption of the leveling layer is optional depending on the display type and object.

In accordance with forming the color filters not by spin-coat method, but by using transcription film, or printing method, not only the manufacturing steps can be decreased significantly, but also the color filters can be formed more flat than ever. Therefore, it is advantageous in lowering cost and improving the contrast high.

In accordance with the present embodiment, the diffusion reflector and the color filters were formed on the separated substrates, but in a case when the diffusion reflector and the color filters were formed on a same substrate, the same characteristics as the present embodiment can be obtained.

Embodiment 4

Next, an example of other reflective color liquid crystal display element of the present invention is explained hereinafter referring to a schematic cross section of FIG. 7.

Figure 7:
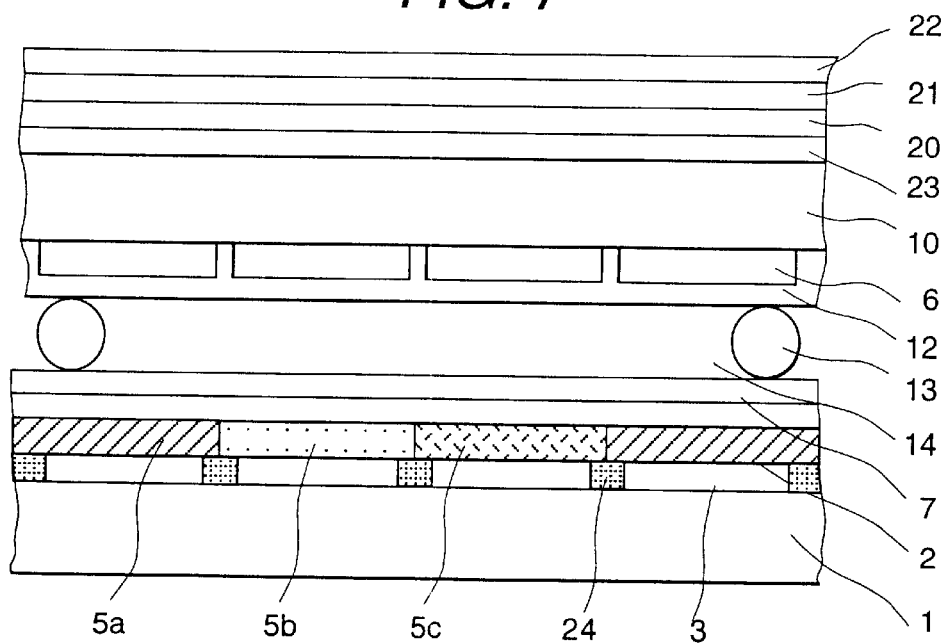
FIG. 7 is a schematic cross section indicating composition of the reflective color liquid crystal display element of the embodiment 4.

As indicated in FIG. 7, the reflective liquid crystal display apparatus was provided with a reflective liquid crystal display element, which was prepared as follows: an electrode substrate, wherein a reflector 3 (silver, film thickness: 100 nm, size: 288 μm ×88 μm, interval: 12 μm), a black matrix layer 24 (silver sulfide treatment, film thickness: 100 nm, width: 12 μm), color filters 5a, 5b, 5c (pigment type, film thickness: 1.2 μm, width: 100 μm), transparent electrode 6 (ITO film, film thickness: 260 nm, width of electrode: 292 μm, interval between electrodes: 8 μm), and alignment layer 7 (polyimide, film thickness: 100 nm), were laminated on a glass substrate 1 (soda glass, plate thickness: 0.7 mm): and another electrode substrate, wherein transparent electrodes 11 (ITO film, film thickness: 260 nm, electrode width: 92 μm, interval between electrodes: 8 μm), and alignment layer (polyimide, film thickness: 100 nm) were laminated on a glass substrate 10 (soda glass, plate thickness: 0.7 mm): the above described two electrode substrates were matched via spacer material 13 of polymer beads (particle size: 6 μm), and liquid crystal 14 (a liquid crystal composition composed of cyano PCH and a transfer derivative, liquid crystal thickness: 6 μm, twisted angle: 250°) was filled into the interval between the two electrode substrates: subsequently, a designated optical scattering plate 23, phase plates 20, 21, and a polarizer 22 were provided onto one of the glass substrate 10 of the reflective liquid crystal display element.

In particular, the black matrix layer 24 is formed by blackening the reflector 3 at portions corresponding to the non-apertures with hydrogen sulfide solution using a photolithography method. Therefore, no steps are generated on surface of the reflector, and surface of the color filters 5a, 5b, 5c, formed on the reflective layer become flat. Accordingly, a reflective color liquid crystal display apparatus, which can display high contrast and uniform images even if the leveling layer is removed, can be provided.

In accordance with the present embodiment, the signal electrodes requiring a high preciseness can be formed directly on the one glass substrate, because the polymer layer, i.e. a base layer of the diffusion reflector, the reflector, and the color filters were gathered to another glass substrate. Therefore, an advantage to improve the production yield of the liquid crystal display element can be realized.

Furthermore, mounting and correction of TCP, which is provided with IC for liquid crystal driving, are easy, and an advantage to improve the production yield of the liquid crystal element can be achieved.

In accordance with the present embodiment, the reflector was made with silver of 100 nm thick using hydrogen sulfide solution as the blackening treatment agent, but the materials of the reflector and the treatment agent can be selected based on the object.

Adoption of the leveling layer formed between the color filters 5a, 5b, 5c and the transparent electrode 6 (not shown in the figure) is arbitrary depending on the object.

In accordance with the present embodiment, the diffusion reflector and the color filters are formed on a same substrate. However, even if the diffusion reflector and the color filters are formed on different substrates, separately, the same characteristics as the present embodiment can be obtained.

Embodiment 5

Next, an example of other reflective color liquid crystal display element of the present invention is explained hereinafter referring to a schematic cross section of FIG. 8.

Figure 8:
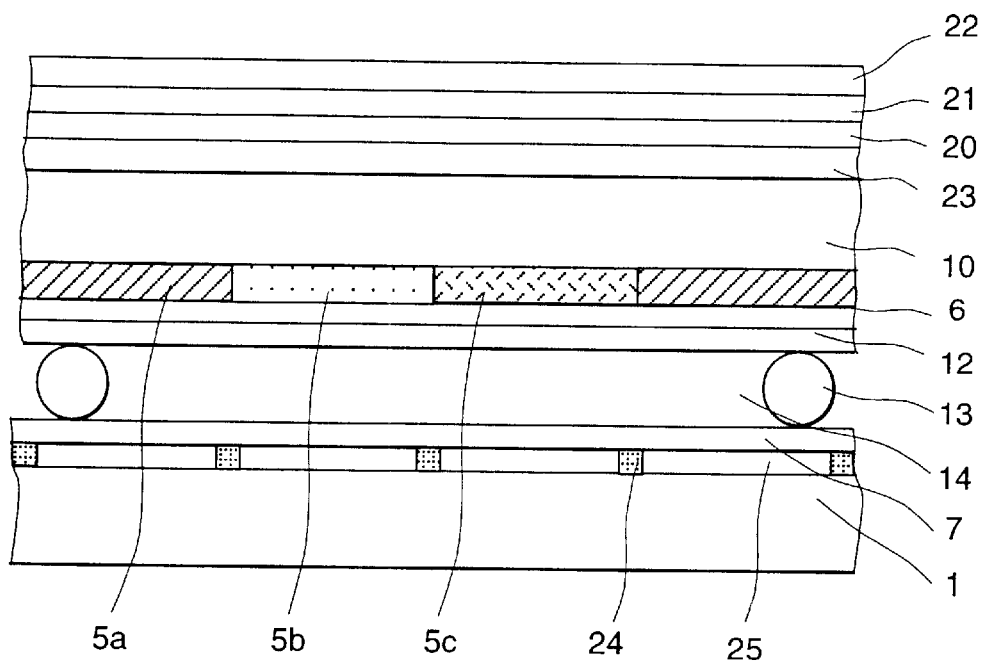
FIG. 8 is a schematic cross section indicating composition of the reflective color liquid crystal display element of the embodiment 5.

As indicated in FIG. 8, the reflective liquid crystal display apparatus was provided with a reflective liquid crystal display element, which was prepared as follows: an electrode substrate, wherein electrodes and reflective layer 25 (aluminum, film thickness: 100 nm, number of electrodes: 1920, width of electrode: 92 $\mu$m, interval between the electrodes: 8 $\mu$m), black matrix layer 24 (pigment black, film thickness: 100 nm, line width: 12 $\mu$m), and alignment layer 7 (polyimide group, film thickness: 100 nm), were laminated on a glass substrate 1 (soda glass, plate thickness: 0.7 mm): and another electrode substrate, wherein color filters 5a, 5b, 5c (pigment type, film thickness: 1.2 $\mu$m, width: 100 $\mu$m), transparent electrode 6 (ITO film, film thickness: 260 $\mu$m, number of electrode: 480, width of electrode: 292 $\mu$m, interval between electrodes: 8 $\mu$m), and alignment layer 12 (polyimide group, film thickness: 100 nm) were laminated on a glass substrate 10 (soda glass, plate thickness: 0.7 mm): the above described two electrode substrates were matched via spacer material 13 of polymer beads (particle size: 6 $\mu$m), and liquid crystal 14 (a liquid crystal composition composed of cyano PCH and a transfer derivative, liquid crystal thickness: 6 $\mu$m, twisted angle: 250°) was filled into the interval between the two electrode substrates: subsequently, a designated optical scattering plate 23, phase plates 20, 21, and a polarizer 22 were provided onto one of the glass substrate 10 of the reflective liquid crystal display element.

In particular, by making a structure, wherein the metallic electrode operates at the same time as the reflector, the aperture which determines the brightness can be decided only by the preciseness of patterning the metallic electrode and reflector 25, and the transparent electrodes 6. Accordingly, a reflective color liquid crystal display apparatus, which can display bright and high contrast images, can be provided.

In accordance with the present embodiment, surface of the alignment layer 7 can be leveled by using a so-called back-exposure method, wherein the black matrix layer 24, which is provided in intervals of the metallic electrodes and reflector 25, is formed by irradiating an ultraviolet ray from the glass substrate 1 side using the metallic electrodes and reflector 25 as a photo mask. Therefore, a reflective color liquid crystal display apparatus, which can display bright and high contrast images, can be provided.

In accordance with the present embodiment, the color filters and the scanning electrodes having a small number of electrodes are formed on the one glass substrate, and the signal electrodes, which requires a high preciseness and a large number of electrodes, are formed directly on the other glass substrate. Therefore, an advantage to improve the production yield of the liquid crystal display element can be realized.

Furthermore, mounting and correction of TCP, which is provided with IC for driving liquid crystal, are easy, and an advantage to improve the production yield of the liquid crystal element can be achieved.

In accordance with the present embodiment, the electrodes and reflector 25 were made of aluminum of 100 nm thick, and the black matrix layer was made of a photosensitive resin, wherein a black pigment was dispersed. However, the material for the electrode and reflector and others can be selected based on the object.

Adoption of the leveling layer formed between the electrode and reflector 25 and the alignment layer 7, and the color filters 5a, 5b, 5c and the transparent electrode 6 (not shown in the figure) is arbitrary depending on the object.

In accordance with the present invention, (1) Unnecessary reflected light from the non-aperture portions can be eliminated by absorbing the incident light to the non-aperture portions by not only patterning the reflective layer of the diffusion reflector so as to correspond to the dot size of the color filter, but also blackening the polymer layer having the protrusions and depressions under the reflective layer. Therefore, a reflective color liquid crystal display apparatus, which can display bright and high contrast images, can be provided.

(2) A reflective color liquid crystal display element of a high aperture ratio, which does not require the black matrix layer forming on the reflective layer, can be manufactured by not only patterning the reflective layer of the diffusion reflector so as to correspond to the dot size of the color filter, but also giving a black matrix function to the polymer layer having the protrusions and depressions under the reflective layer. Therefore, a reflective color liquid crystal display apparatus, which can display bright and high contrast images, can be provided.

(3) Mounting and correction of TCP, which is provided with IC for liquid crystal driving, can be performed with a high production yield in manufacturing the liquid crystal display element, because the signal electrodes having a high preciseness can be formed directly on the one glass substrate by forming the diffusion reflective film and the color filters are formed on the other same substrate. Therefore, a reflective color liquid crystal display apparatus, which can display bright and high contrast images, can be provided with a low cost.

(4) Unnecessary reflected light from the non-aperture portions can be decreased significantly by forming rectangular shaped reflective layers at only portions corresponding to apertures by patterning the reflective layer of the diffusion reflector so as to correspond to the dot size of the color filter, and providing a black matrix layer having the same thickness as the reflective layer at intervals of the reflector. Therefore, a reflective color liquid crystal display apparatus, which can display bright and high contrast images, can be achieved with a low cost.

Other embodiments of the present invention is explained, hereinafter.

A practical example of the reflective color liquid crystal display apparatus provided with an internal diffusion reflector having novel patterns of the present invention is as follows:

An electrode substrate is manufactured by the following steps:

(1) A manufacturing step for generating patterns of string shaped protrusions, and string shaped depressions by simulation of spinodal decomposition. Here, model equations of spinodal decomposition for performing the simulation of spinodal decomposition are such as Cahn-Hilliard (–Cook) equation given by the equation 1, time dependent Ginzburg-Landau equation given by the equation 2, and others.

$$\partial\phi(r,t)/(\partial t)=L\nabla^2(\partial H\{\phi(r,t)\}/\partial\phi(r,t) \quad \text{(Equation 1)}$$

$$H\{\phi(r,t)\}/(k_B T)=\int dr[-A\ln(\cos h\phi)+(\tfrac{1}{2})\phi^2+D/2(\nabla\phi)^2] \quad \text{(Equation 2)}$$

A pattern simulated the spinodal decomposition can be generated by numerical simulation of spinodal decomposition model (enlarged moor approximation) by Cell-Dynamical-System (CDS) indicated by the equation 3.

$$<<\phi>>-\phi=(\tfrac{1}{6})(\Sigma\phi_{CLOSEST})+(\tfrac{1}{12})(\Sigma\phi_{NEXT\ CLOSEST})-\phi \quad \text{(Equation 3)}$$

In accordance with using any one of the above equations, a pattern having many smooth protrusions-depressions satisfying the following conditions can be formed: the conditions are that; 1) the pattern is composed of string shaped protruded pattern or depressed pattern having approximately uniform line width and smooth curves, 2) the string shaped protrusions or string shaped depressions are arranged continuously, or alternately, 3) slope angles of the cross sections of the string shaped protrusion and string shaped depression in a direction perpendicular to the longitudinal direction of the string shaped protrusion and string shaped depression are approximately symmetrical from right and left, 4) sums of length of the protrusions or the depressions in respective direction are approximately equal, or 5) sums of length of the protrusions or the depressions differ each other in the respective direction.

A manufacturing step for making a pattern with a photosensitive resin by adding light (wavelength: 365 nm, dose: 50–500 mj/cm$^2$), heat (50–150° C.), and pressure (1–12 kg/cm$^2$) to a resin pattern formed with the resin applied onto a glass substrate by a transcription roll (roll velocity: 0.1–3 m/minute), or plate and the like using the transcription roll or the plate having the pattern composed of the above string shaped protrusion or the above string shaped depressions.

Or a manufacturing step for making a pattern (width: 5–20 μm, height or depth: 0.5–2.0 μm) by exposing light (wavelength: 365 m, dose 50–500 mj/cm$^2$) via a photo mask using the string shaped pattern prepared by the simulation method of the spinodal decomposition for generating the string shaped pattern as black matrix pattern or transparent pattern, and a designated development and curing, (2) A manufacturing step for forming a reflector (a thin film made of aluminum, an aluminum alloy, silver, an silver alloy, film thickness: 100–300 nm) on the patterned polymer layer, (3) A manufacturing step for forming an insulating layer (acrylic group photosensitive resin or non-photosensitive resin, film thickness: 1.0–3.0 μm) on the reflector, (4) A manufacturing step for adhering transparent electrodes (ITO (Indium Tin Oxide), film thickness: 100–300 nm), and patterning (number of the electrodes: 1920, pitch: 100 μm, interval between the electrodes: 8–20 μm) on the insulating layer, and (5) A manufacturing step for forming an alignment layer (polyimide, film thickness: 50–100 nm, temperature: 230–250° C.) on the transparent electrodes.

Another electrode substrate is manufactured on a glass substrate by the following steps:

(6) A manufacturing step for forming a black matrix layer (a low surface reflection black matrix layer such as a black pigment dispersion type photosensitive resin, and three layered chromium, and the like, film thickness: 0.1–1.2 μm, pitch: 100 μm, width: 10–25 μm), (7) A manufacturing step for forming color filters (red, green, blue or cyan, magenta, yellow, pigment dispersion type acrylic group photosensitive resin, film thickness: 0.5–1.5 μm, pitch: 100 μm, width: 75–90 μm) on the black matrix layer, (8) A manufacturing step for forming a leveling layer (acrylic group photosensitive resin, film thickness: 1.0–3.0 μm, curing temperature: 230–250° C./1 hour) on the color filters, (9) A manufacturing step for adhering transparent electrodes (ITO (Indium Tin Oxide), film thickness: 100–300 nm),and patterning (number of the electrodes: 240, pitch: 300 μm, interval between the electrodes: 8–20 μm) on the leveling film, and

(10) A manufacturing step for forming an alignment layer (polyimide, film thickness: 50–150 nm, temperature: 230–250° C.) on the transparent electrodes.

Then, a liquid crystal display element is composed by:

(11) A step for matching the above two electrode substrates so as to make each of the alignment layers of both electrode substrates faces each other via spacer material (polymer beads, silica beads, glass fiber, particle size: 6 μm), and peripheries of the both electrode substrates are adhered and sealed with a sealing agent (epoxy rein, wherein the above spacer material is dispersed), and

(12) A manufacturing step for filing a liquid crystal into the interval between the two electrode substrates.

Then, a liquid crystal display apparatus is completed by:

(13) A manufacturing step for adhering a designated phase plates and a polarizer onto one of the glass substrate, where the reflector is not formed, of the reflective liquid crystal display element,

(14) A manufacturing step for connecting a TCP, whereon an IC for driving liquid crystal is mounted, and an external driving circuit to the liquid crystal display element, and

(15) A manufacturing step of assembling the liquid crystal display element to a case, or frame, and the like.

In accordance with the present invention, a reflective color liquid crystal display apparatus displaying bright images can be provided, because the reflective color liquid crystal display apparatus comprises inside a reflector having smooth protrusion and depression planes, whereon string shaped protrusions or string shaped depressions are arranged so as to be closest at portions corresponding to the pixel electrodes; the string shaped protrusions or string shaped depressions are formed for reflecting incident light from all the direction, or incident light from a specified direction, to the viewer as much as possible.

In accordance with the present invention, a reflective color liquid crystal display apparatus, which can obtain bright images, can be provided with a low cost; because the reflective color liquid crystal display apparatus comprises a-pattern, which is an irregular arranging pattern and string shaped protrusions or string shaped depressions can be arranged in a closest manner, by using a phase separation and generation pattern obtained by a computer simulation method for analyzing spinodal decomposition, which is known as a phase separation phenomenon of polymeric block polymer and others, as an original pattern for transcription role, plates, or photo masks of forming the string shaped protrusions or string shaped depressions.

Further, in accordance with the present invention, a reflective color liquid crystal display apparatus and reflectors having a desired reflecting characteristics can be provided; because reflecting characteristics control such as collecting the reflecting light in a specified direction, and the like, can be performed easily, by controlling arranging ratio of length components of the string shaped protrusion or string shaped depression in various direction without changing cross sectional shapes of the protrusion and depression for using the string shaped pattern, which can be controlled arbitrarily by a computer simulation, as patterns for dies of the transcription role or plates, or photo mask patterns.

Furthermore, in accordance with the present invention, a reflective color liquid crystal display apparatus and reflectors, which can not only collect incident light from all the directions to the viewer, but also obtain less positive reflecting component (light component reflected from flat portions), which deteriorates images, and brighter images, can be provided; because photo masks or transcription dies, which are most suitable for forming methods such as transcription method, photolithography, and others, can be formed readily by taking the phase separation and generation pattern obtained by computer simulation into a computer, and performing image processing to modify to the patterns.

A reflective color liquid crystal display apparatus most suitable for executing the present invention is explained, hereinafter.

In accordance with the present invention, a hand-held personal computer (hereinafter, called hand-held PC) corresponding to ½ VGA of display scale 540×240 dots(picture element pitch: 0.3 mm×0.3 mm, pixel size: 0.288 mm×0.288 mm, display diagonal size: 8.1 inches), and a reflective super twisted nematic mode color liquid crystal display apparatus for outdoor use (hereinafter, called reflective STN mode color liquid crystal display apparatus) are mainly explained.

However, because the present invention does not depend on the driving system of the liquid crystal, the present invention is not restricted to STN mode liquid crystal display system, but is applicable to any one of active addressing method and passive method.

Embodiment 6

In accordance with the reflective liquid crystal display apparatus of the present invention, bright images, which have no coloring by optical interference, can be obtained by forming the string shaped protrusions and depressions in the polymer layer, which is the base layer of the diffusion reflector.

FIG. 9a indicates a photo mask pattern for forming string shaped protrusion and depression pattern in the polymer layer, i.e. the base layer of the diffusion reflector, and the dark portions (light shielding portions) are the portions to be the protrusion or the depression. However, depending on the material used, reversing the dark portions and the bright portions in the same pattern becomes necessary. FIG. 1b indicates the polymer layer generated by the photo mask pattern indicated in FIG. 1a.

FIG. 10 indicates a portion of cross section of the polymer layer, whereon the string shaped protrusion and depression are formed, indicated in FIG. 9b taken along the line a1–a2.

Figure 10A:
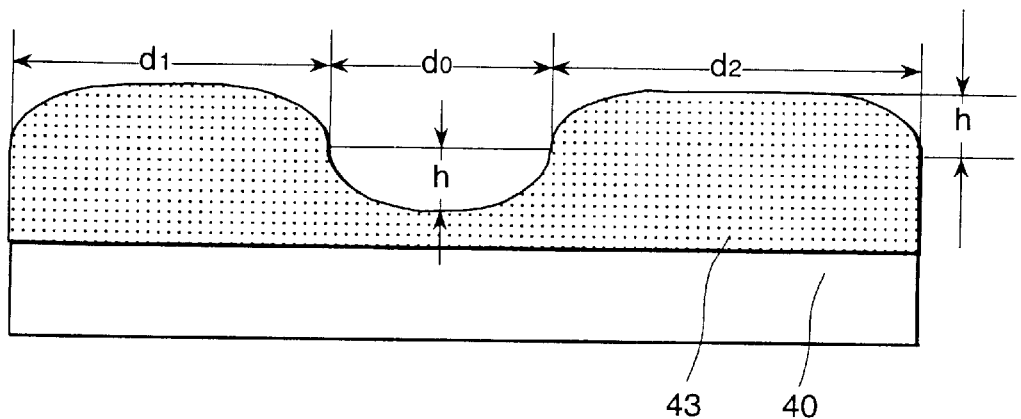
FIG. 10 is an illustration indicating a cross sectional structure of the diffusion reflector composed of string shaped protrusions and string shaped depressions.

FIG. 10a indicates a pattern, wherein the string shaped protrusions and the string shaped depressions are arranged alternately and continuously.

Figure 10B:
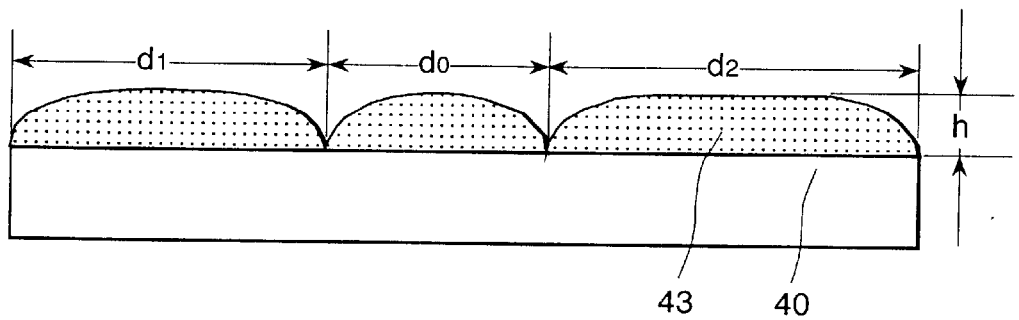

FIG. 10b indicates a pattern, wherein the string shaped protrusions are arranged continuously.

Figure 10C:
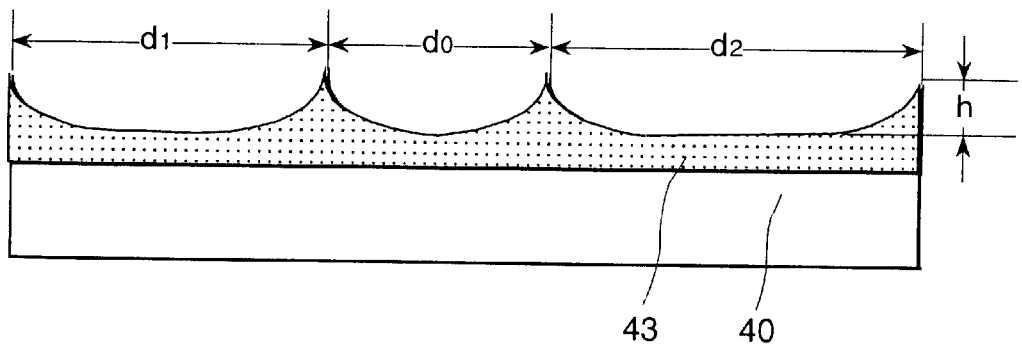

FIG. 10c indicates a pattern, wherein the string shaped depressions are arranged continuously.

Here, d0, d1, and d2 indicate the length of the protrusion or the depression, and h indicates the height of the protrusion or the depth of the depression. The d1 indicates the length of the portion, where the pattern of the protrusion or the depression crosses perpendicularly with the line a1–a2, and this is equivalent to the width of the protrusion or the depression. That is, FIG. 10b means that the pattern is formed by arranging the protrusions or the depressions drawing parabolas of height h continuously. Sometimes, depending on the material, all the widths can not be maintained equal completely. However, if the widths are approximately equal, the advantages of the present invention can be realized.

Features of the string shaped protrusion, the string shaped depression, or the string shaped protrusion and depression formed in the polymer layer of the present invention are explained hereinafter.

Because incident light reflects the shape of the protrusion or the depression of the string shaped pattern, in case when drawing parabolas, of which slope angles distribute in approximately symmetrical from right and left, the distribution of the intensity of reflected light becomes symmetrical from right and left in the direction normal to the substrate. Accordingly, if it may be unsymmetrical from right and left, the distribution of the intensity of reflected light becomes unsymmetrical from right and left, and it becomes possible to make the distribution of the intensity of reflected light have a direction.

The sum of the intensity distribution of light as indicated in FIG. 9b depends on the lengths d0, d1, and d2 of the protrusion or the depression indicated in FIG. 10. Accordingly, when the sum of the length of the protrusion or the depression in a lateral direction (in a direction of b1), and the sum of the length of the protrusion or the depression in a vertical direction (in a direction of b2) indicated in FIG. 9b are equal, the sums of the intensity distribution of light in the lateral direction and in the vertical direction become equal. That is, the brightness in the lateral direction and the brightness in the vertical direction become equal. When the sum of the length of the protrusion or the depression in the vertical direction (in a direction of b2) is longer than the sum of the length of the protrusion or the depression in the lateral direction (in a direction of b1), the sums of the intensity distribution of light in the lateral direction becomes larger than the sums of the intensity distribution of light in the vertical direction. That is, the lateral direction becomes brighter than the vertical direction. The above situation is similar in diagonal directions (the directions of b3 and b4), and brightness can be changed or made equal by the length of the protrusion or the depression. The vertical lines in FIG. 10 indicate boundaries of the protrusion and the depression, protrusion and protrusion, and depression and depression. Accordingly, if a ratio of the numbers of the boundaries in the vertical direction and in the lateral direction is same, the brightness in the vertical direction and in the lateral direction are equal.

If the protrusion and the depression in a string shaped pattern extend linearly (in parallel) in a same direction, the brightness is decreased by interference of light. Then, the protrusion and the depression in a string shaped pattern indicated in FIG. 9b are composed to extend with drawing curves. That is, the interference of light can be decreased by decreasing the linear portions in parallel of the protrusion and the depression. Most preferable composition is that each of the protrusion and the depression draws curves, and extend in random directions (indiscriminately). In this case, the interference of light becomes minimum.

As indicated in FIGS. 10a, 10b, and 10c, flat portions between the protrusion and depression, the protrusion and protrusion, and depression and depression can be eliminated by forming the protrusions and depressions adjacently so that the protrusions and the depressions extend continuously. Accordingly, the reflector can be made brighter one, because not only the flat portions causing unnecessary positive reflecting light are eliminated, but also the incident light is collected effectively in a direction to the viewer.

When the protrusions and the depressions are formed continuously so as not to leave the flat portions, the protrusions and the depressions are arranged closest. Therefore, this state is called as a closest packing arrangement, hereinafter.

In accordance with the present embodiment, the length d corresponding to the width of the string shaped protrusion or the string shaped depression was selected in the range of 5–20 $\mu$m, preferably in the range of 8–15 $\mu$m, and height and depth of the string shaped protrusion or the string shaped depression was made in the range of 0.5–2.0 $\mu$m, preferably in the range of 0.8–1.5 $\mu$m.

Figure 11:
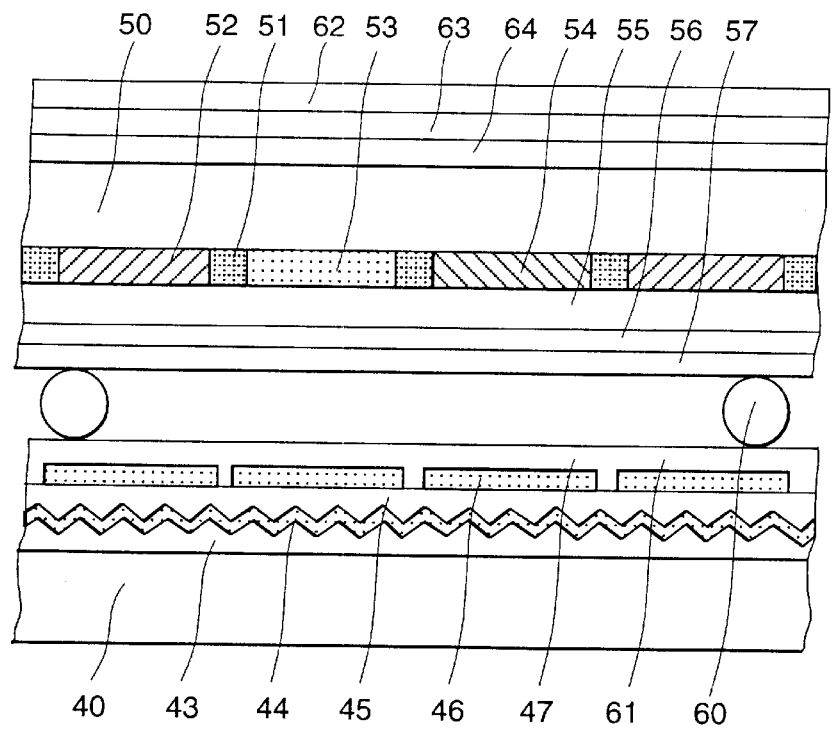
FIG.11 is a schematic cross section indicating a composition of the reflective color liquid crystal display element in the embodiment 6.
Figure 12:
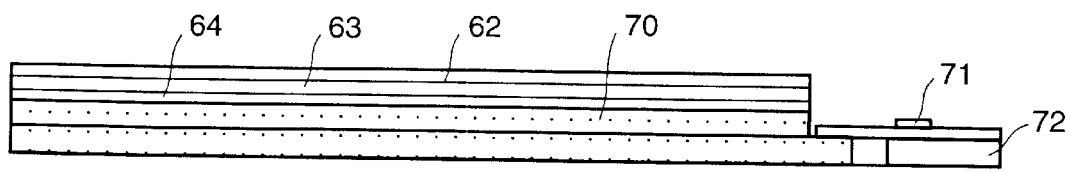
FIG.12 is a schematic cross section indicating a composition of the reflective color liquid crystal display apparatus of the present invention.

A cross sectional structure of the embodiment of the liquid crystal display element and the liquid crystal display apparatus used in the reflective liquid crystal display apparatus of the present invention are indicated in FIG. 11 and FIG. 12, respectively. FIG. 11 indicates a cross sectional structure of the liquid crystal display element, and FIG. 12 indicates a cross sectional structure of the liquid crystal display apparatus.

As indicated in FIG. 11, the one electrode substrate of the liquid crystal display element is composed by laminating: a polymer layer 43 having many protrusion-depression planes composed of string shaped protrusions and string shaped depressions (acrylic group, film thickness: 1.5 $\mu$m, width of the protrusion or the depression: 13 $\mu$m, height of the protrusion or the depression: 1.0 $\mu$m), a reflector 14 (aluminum, film thickness: 100 nm), an insulating layer 45 (acrylic group, film thickness: 2.0 $\mu$m), transparent electrodes 46 (ITO film, film thickness: 260 nm, number of electrodes: 1920, pitch of the electrodes: 100 $\mu$m, width of electrode: 88 $\mu$m, interval between the electrodes: 12 $\mu$m), and an alignment layer 17 (polyimido group, film thickness: 100 nm) on a glass substrate 40 (soda glass, plate thickness: 0.7 mm).

The other electrode substrate of the liquid crystal display element is composed by laminating: a black matrix layer 51 (three layered chromium, film thickness: 0.1 $\mu$m, width: 12 $\mu$m, pigment black, film thickness: 0.6 $\mu$m, width 12 $\mu$film thickness: 1.2 $\mu$m, width: 100 $\mu$m), leveling film 55 (acrylic group, film thickness: 2.0 $\mu$m), transparent electrodes 56 (ITO film, film thickness: 260 nm, number of electrodes: 240, pitch of the electrodes: 300 $\mu$m, width of electrode: 288 $\mu$m, interval between the electrodes: 12 $\mu$m), and an alignment layer 57 (polyimide group, film thickness: 100 nm) on a glass substrate 50 (soda glass, plate thickness: 0.7 mm). These glass substrates are matched via spacer material 60 of polymer beads (particle size: 6 $\mu$m), and liquid crystal 61 (a liquid crystal composition composed of cyano PCH and a transfer derivative, liquid crystal thickness: 6 $\mu$m, twisted angle: 250°) is filled into the interval between the two glass substrates 40, 50. The reflective color liquid crystal display element is composed by arranging designated phase plates 63, 64, and a polarizer 62 onto one of the glass substrate 50. As indicated in FIG. 12, a reflective color liquid crystal display apparatus is composed by mounting a tape carrier package mounting IC for driving the liquid crystal, and an external driving circuit 72 on the liquid crystal display element 70.

In accordance with the present embodiment, reflective color liquid crystal display apparatus having no optical interference, which can display bright images, can be provided; because a reflective color liquid crystal display element having inside a reflector, wherein the string shaped protrusions or the string shaped depressions are arranged in the regions corresponding to the pixels randomly and in a manner of closest packing arrangement, can be manufactured by forming reflectors for collecting incident light from all the directions in a direction to the viewer with the string shaped protrusions or the string shaped depressions.

In accordance with the present embodiment, a reflective color liquid crystal display apparatus having no optical interference, which can display bright images, can be provided; because the arrangement of the string shaped protrusions or the string shaped depressions can be controlled arbitrary and the reflective color liquid crystal display element adequate for illuminating environment can be manufactured by preparing a photo mask pattern or a transcription pattern for forming the fine protrusions-depressions pattern composed of the string shaped protrusion or the string shaped depression by a computer simulation method for analyzing spinodal decomposition, which is known by a phase separation phenomenon such as polymeric block copolymer and others.

In accordance with the present embodiment, a reflective color liquid crystal display apparatus can be provided with a low price; because the reflective color liquid crystal display element can be manufactured with a low cost by forming the polymer layer having the fine protrusion-depression planes composed of the string shaped protrusion or the string shaped depression by a transcription method with transcription role, transcription plate, or transcription film, wherein polymer layers having fine protrusion-depression planes composed of the string shaped depression on its base film are laminated.

It is common to all through the following embodiment, that, in accordance with the present invention, the string shaped protrusion or the string shaped depression have been prepared using the computer simulation method for analyzing spinodal decomposition. However, the pattern may be prepared directly by; controlling environmental conditions such as temperature, pressure and others of the polymer, liquid crystal, colloid, and others; and inducing the phenomena such as phase transfer, or phase separation, and others.

In accordance with the present embodiment, the width of the string shaped protrusion or the string shaped depression was selected as 13 $\mu$m. However, the present invention is not restricted with this width. Furthermore, in accordance with the present embodiment, the width of the string shaped protrusion or the string shaped depression was selected only one kind such as 13 $\mu$m. However, the present invention can be composed of plural string shaped protrusions or the string shaped depressions having different widths each other. In accordance with composing with the different widths each other, the intensity distribution to angles can be altered, and the bright images can be displayed in a wide range.

Embodiment 7

Figure 13:
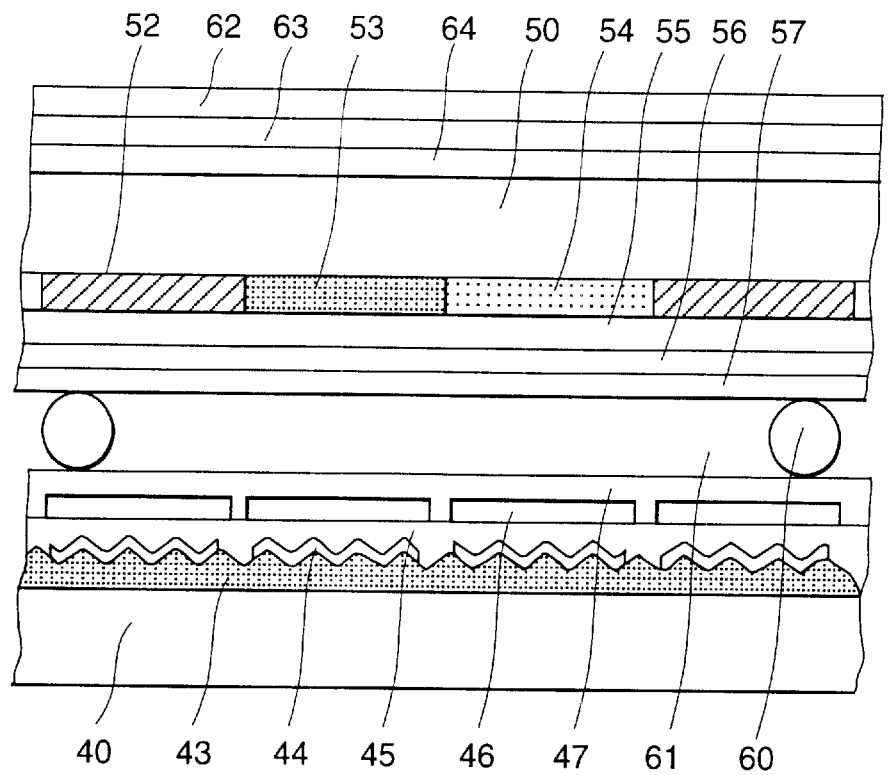
FIG.13 is a schematic cross section indicating a composition of the reflective color liquid crystal display element in the embodiment 7.

FIG. 13 indicates a cross sectional structure of the other liquid crystal display element of the present invention.

As indicated in FIG. 13, the one electrode substrate of the liquid crystal display element is composed by laminating: a polymer layer 43 having many protrusion-depression planes composed of string shaped protrusions and string shaped depressions (optical absorber: black pigment, base material: photosensitive acrylic resin, film thickness: 0.6 μm, width of the protrusion or the depression: 13 μm, height of the protrusion or the depression: 1.0 μm), a reflector 44 arranged only at portions corresponding to the pixels (aluminum, film thickness: 100 nm, size: 88 μm ×288 μm), an insulating layer 45 (acrylic group, film thickness: 2.0 μm), transparent electrodes 46 (ITO film, film thickness: 260 nm, number of electrodes: 1920, pitch of the electrodes: 100 μm, width of electrode: 92 μm, interval between the electrodes: 8 μm), and an alignment layer 47 (polyimide group, film thickness: 100 nm) on a glass substrate 40 (soda lass, plate thickness: 0.7 mm).

The other electrode substrate of the liquid crystal display element is composed by laminating: color filters 52, 53, 54 (pigment type, film thickness: 1.2 μm, width: 100 μm) (yellow, cyan, and magenta are usable), a leveling layer 55 (acrylic group, film thickness: 2.0 μm), transparent electrodes 56 (ITO film, film thickness: 260 nm, number of electrodes: 240, pitch of the electrodes: 300 μm, width of electrode: 292 μm, interval between the electrodes: 8 μm), and an alignment layer 57 (polyimide group, film thickness: 100 nm) on a glass substrate 50 (soda glass, plate thickness: 0.7 mm). These glass substrates are matched via spacer material 60 of polymer beads (particle size: 6 μm), and liquid crystal 61 (a liquid crystal composition composed of cyano PCH and a transfer derivative, liquid crystal thickness: 6 μm, twisted angle: 250°) is filled into the interval between the two glass substrates 40, 50. The reflective color liquid crystal display element is composed by arranging designated phase plates 63, 64, and a polarizer 62 onto one of the glass substrate 50. FIG. 12 indicates a reflective color liquid crystal display apparatus composed by mounting a tape carrier package 71 mounted with IC for driving the liquid crystal, and an external circuit for driving 72 on the liquid crystal display element 70.

In accordance with the present embodiment, reflective color liquid crystal display apparatus, which can display bright and high contrast images, can be provided; because a reflective color liquid crystal display element having a structure of an uniform liquid crystal thickness, wherein only the color filters 53, 54, 55 are arranged on a facing substrate, can be manufactured by adding a black matrix function to the reflective electrode substrate by dispersing black pigment into the polymer layer 41 having fine protrusion-depression planes composed of the string shaped protrusions or the string shaped depressions, patterning the reflector 44 in rectangular shapes, and arranging at only portions corresponding to the pixel electrode.

In accordance with the present embodiment, a reflective color liquid crystal display apparatus, which can display bright and high contrast images, can be provided; because the reflective color liquid crystal display element having a high aperture ratio can be manufactured by performing a patterning treatment, which determines the aperture ratio, only on the metallic reflector 44 and the transparent electrodes 46, 56, which are readily treated by the patterning.

In accordance with the present embodiment, a reflective color liquid crystal display apparatus, which can display bright and high contrast images, can be provided with a low cost; because the reflective color liquid crystal display element can be manufactured with a low cost by forming the color filters 52, 53, 54 with three colors simultaneous printing method.

Embodiment 8

Figure 14:
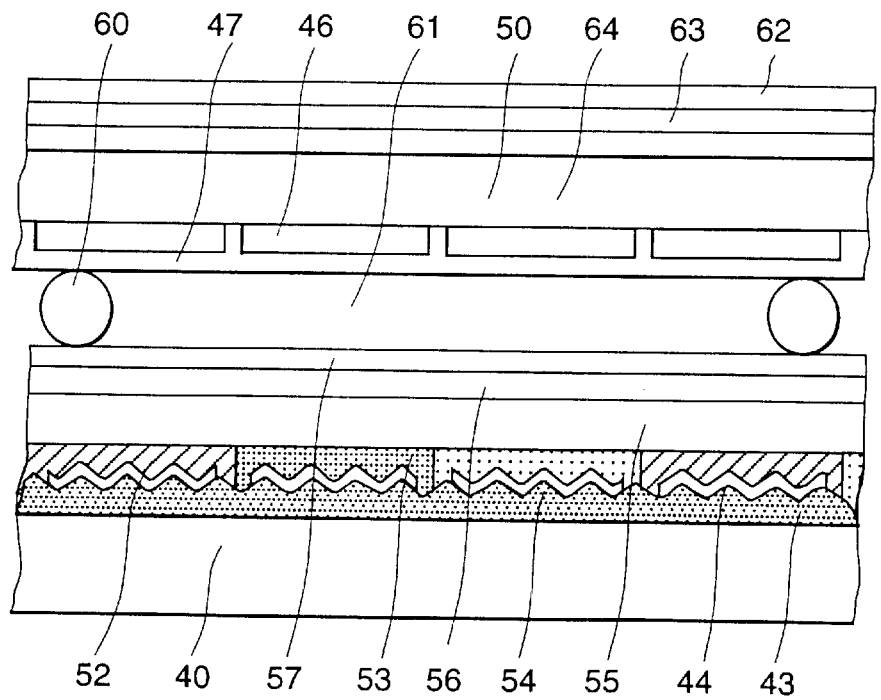
FIG.14 is a schematic cross section indicating a composition of the reflective color liquid crystal display element in the embodiment 8.
Figure 16A:
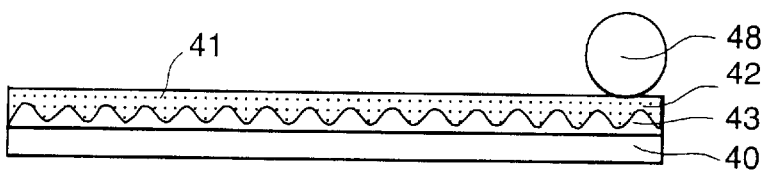
FIG. 16 is a set of schematic cross sections indicating a method for manufacturing the reflective color liquid crystal display element in the embodiment 6.
Figure 16B:
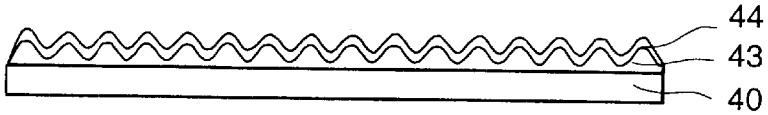
Figure 16C:
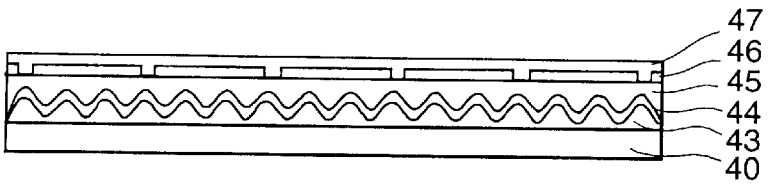
Figure 16D:
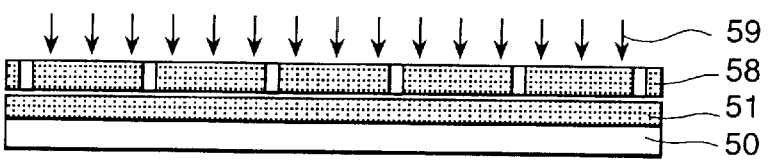
Figure 16E:
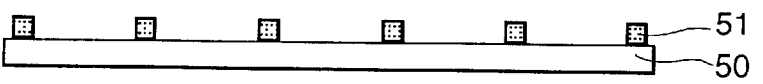
Figure 16F:
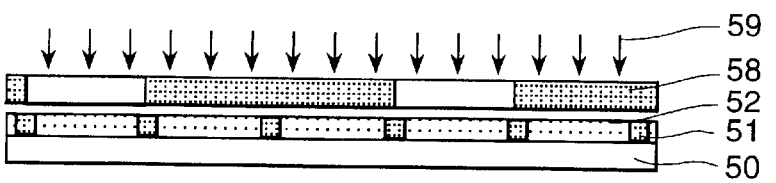
Figure 16G:
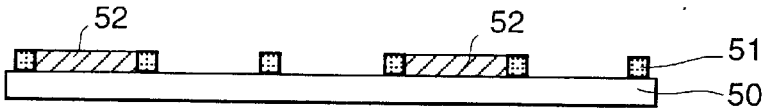
Figure 16H:
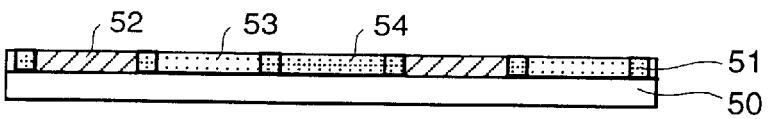
Figure 16I:
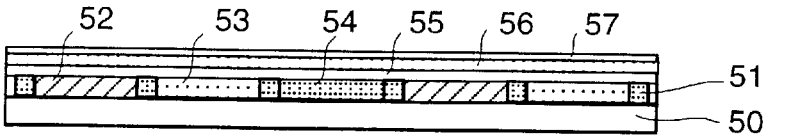
Figure 16J:
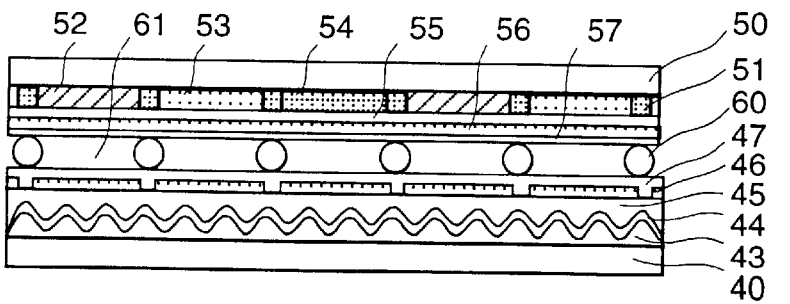
Figure 17A:
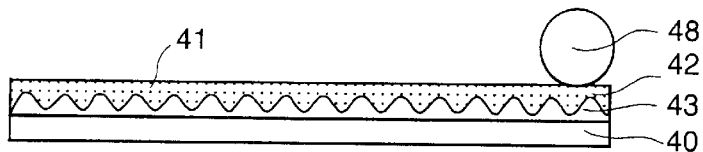
FIG. 17 is a set of schematic cross sections indicating a method for manufacturing the reflective color liquid crystal display element in the embodiment 7.
Figure 17B:
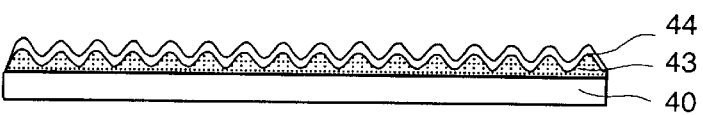
Figure 17C:
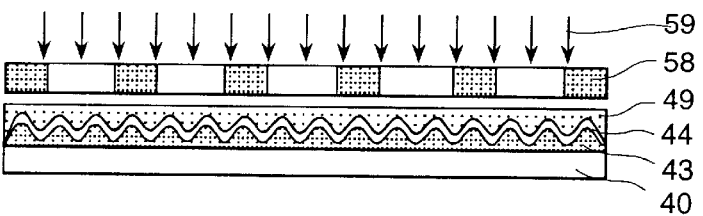
Figure 17D:
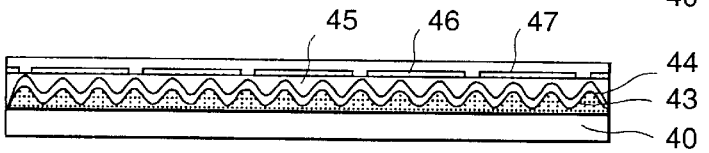
Figure 17E:
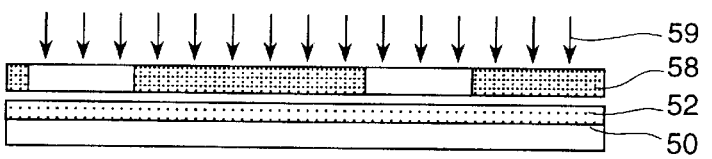
Figure 17F:
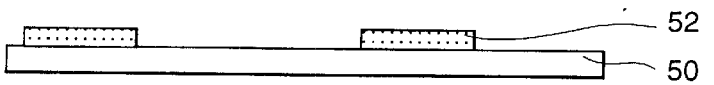
Figure 17G:
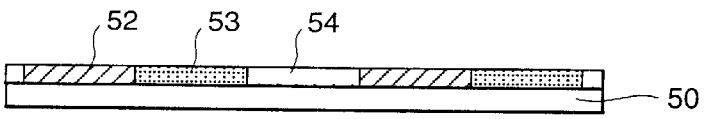
Figure 17H:
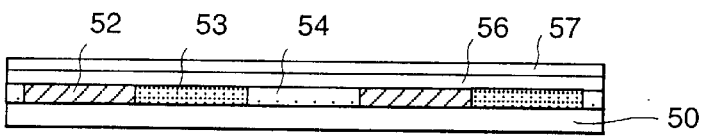
Figure 17I:
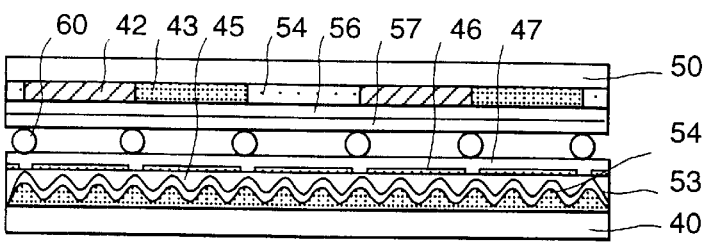

FIG. 14 indicates a cross sectional structure of the other liquid crystal display element of the present invention.

As indicated in FIG. 14, the one electrode substrate of the liquid crystal display element is composed by laminating: a polymer layer 43 having many protrusion-depression planes composed of string shaped protrusions and string shaped depressions (optical absorber: black pigment, base material: photosensitive acrylic resin, film thickness: 0.6 μm, width of the protrusion or the depression: 13 μm, height of the protrusion or the depression: 1.0 μm), color filters 52, 53, 54 of red, green, and blue (pigment type, film thickness: 1.2 μm, width: 100 μm) (yellow, cyan, and magenta are usable), leveling film 55 (acrylic group, film thickness: 2.0 μm), transparent electrodes 46 (ITO film, film thickness: 260 nm, number of electrodes: 240, pitch of the electrodes: 300 μm, width of electrode: 292 μm, interval between the electrodes: 8 μm), and alignment layer 47 (polyimide group, film thickness: 100 nm) on a glass substrate 40 (soda glass, plate thickness: 0.7 mm).

The other electrode substrate of the liquid crystal display element is composed by laminating: transparent electrodes 46 (ITO film, film thickness: 260 nm, number of electrodes: 1920, pitch of the electrodes: 100 μm, width of electrode: 92 μm, interval between the electrodes: 8 μm), and an alignment layer 47 (polyimide group, film thickness: 100 nm) on a glass substrate 50 (soda glass, plate thickness: 0.7 mm).

These two glass substrates are matched via spacer material 60 of polymer beads (particle size: 6 μm), and liquid crystal 61 (a liquid crystal composition composed of cyano PCH and a transfer derivative, liquid crystal thickness: 6 μm, twisted angle: 250°) is filled into the interval between the two glass substrates 40, 50. The reflective color liquid crystal display element is composed by arranging designated phase plates 63, 64, and a polarizer 62 onto one of the glass substrate 50. As indicated in FIG. 12, a reflective color liquid crystal display apparatus is composed by mounting a tape carrier package 71 mounted with IC for driving the liquid crystal, and an external driving circuit 72 on the liquid crystal display element 70.

In accordance with the present embodiment, reflective color liquid crystal display apparatus, which can display bright and high contrast images, can be provided; because a reflective color liquid crystal display element having a high aperture ratio can be manufactured by eliminating the insulating layer and the black matrix layer, which should be arranged between the reflector 44 and the transparent electrodes 46, by providing a black matrix function to the polymer layer 43 by dispersing black pigment into the polymer layer 43 having fine protrusion-depression planes composed of the string shaped protrusions or the string shaped depressions, patterning the reflector 44 in rectangular shapes, and arranging at only portions corresponding to the pixel electrode; and laminating the color filters 53, 54, 55 onto the reflector 44.

In accordance with the present embodiment, an advantage to improve the production yield of the reflective color liquid crystal display element can be achieved; because the signal electrodes requiring a high preciseness can be formed directly on one of the glass substrates by gathering the polymer layer 43, the reflector 44, and the color filters 52, 53, 54 to the other glass substrate.

Furthermore, an advantage to improve the production yield of the liquid crystal element can be achieved, because mounting and correcting the TCP, whereon the IC for driving is provided, can be performed readily.

In accordance with the present embodiment, the leveling layer was arranged on the color filters 52, 53, 54. However, because a leveling function is provided to the color filters by superposed printing using the previously described three colors simultaneous printing method, the reflective color liquid crystal display element having no leveling film 55 can be manufactured, and the reflective color liquid crystal display apparatus, which can display bright and high contrast images, can be provided with a low price.

Embodiment 9

Figure 15:
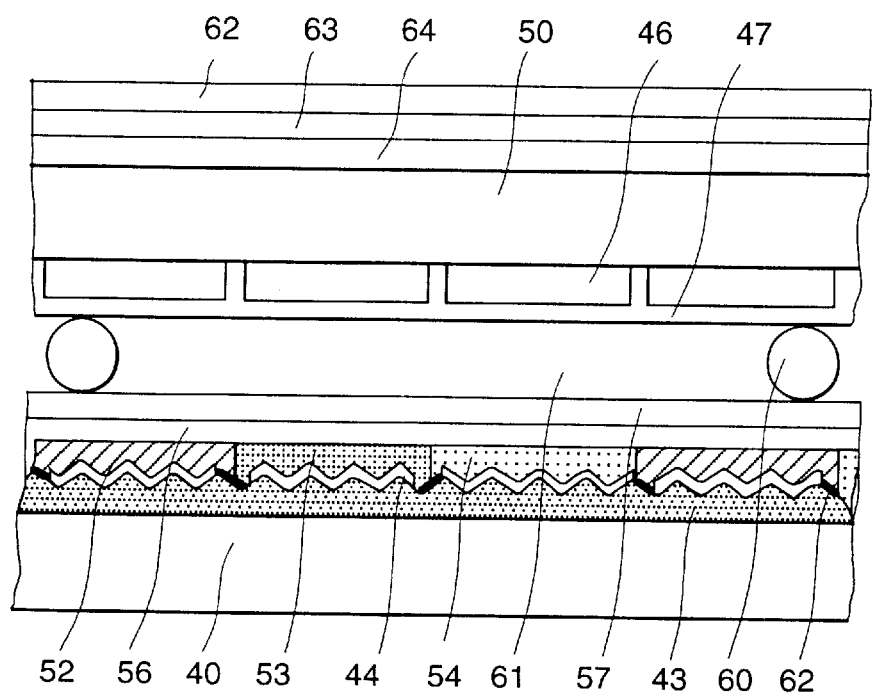
FIG.15 is a schematic cross section indicating a composition of the reflective color liquid crystal display element in the embodiment 9.

FIG. 15 indicates a cross sectional structure of the other liquid crystal display element of the present invention.

As indicated in FIG. 15, the one electrode substrate of the liquid crystal display element is composed by laminating: a polymer layer 43 having many protrusion-depression planes composed of string shaped protrusions and string shaped depressions (optical absorber: black pigment, base material: photosensitive acrylic resin, film thickness: 0.6 $\mu$m, width of the protrusion or the depression: 13 $\mu$m, height of the protrusion or the depression: 1.0 $\mu$m), reflector 44 arranged only at the portions corresponding to the pixel (silver, film thickness: 100 nm), a black matrix layer 65 (blackened by sulfide treatment, pitch: 100 $\mu$m ×300 $\mu$m, width: 12 $\mu$m), color filters 52, 53, 54 (pigment type, film thickness: 1.2 $\mu$m, width: 100 $\mu$m) of red, green, and blue (yellow, cyan, and magenta are usable), transparent electrodes 46 (ITO film, film thickness: 260 nm, number of electrodes: 240, pitch of the electrodes: 300 $\mu$m, width of electrode: 292 $\mu$m, interval between the electrodes: 8 $\mu$m), and an alignment layer 57 (polyimide group, film thickness: 100 nm) on a glass substrate 40 (soda glass, plate thickness: 0.7 mm).

The other electrode substrate of the liquid crystal display element is composed by laminating: transparent electrodes 46 (ITO film, film thickness: 260 nm, number of electrodes: 1920, pitch of the electrodes: 100 $\mu$m, width of electrode: 92 $\mu$m, interval between the electrodes: 8 $\mu$m), and an alignment layer 47 (polyimide group, film thickness: 100 nm) on a glass substrate 50 (soda glass, plate thickness: 0.7 mm).

These two glass substrates are matched via spacer material 60 of polymer beads (particle size: 6 $\mu$m), and liquid crystal 61 (a liquid crystal composition composed of cyano PCH and a transfer derivative, liquid crystal thickness: 6 $\mu$m, twisted angle: 250°) is filled into the interval between the two glass substrates. The reflective color liquid crystal display element is composed by arranging designated phase plates 63, 64, and a polarizer 62 onto one of the glass substrate 50. As indicated in FIG. 12, a reflective color liquid crystal display apparatus is composed by mounting a tape carrier package 71 mounted with IC for driving the liquid crystal, and an external driving circuit 72 on the liquid crystal display element 70.

In accordance with the present embodiment, reflective color liquid crystal display apparatus, which can display bright and high contrast images, can be provided; because a reflective color liquid crystal display element having a flat surface color filters 52, 53, 54 can be manufactured by adding a black matrix function, without generating any steps on the reflector, but blackening only the portions of the reflector corresponding to the black matrix portions by sulfide treatment and the like, and patterning the reflector 44 formed on the polymer layer 43 having fine protrusion-depression planes composed of the string shaped protrusions or the string shaped depressions is not performed.

In accordance with the present embodiment, reflective color liquid crystal display apparatus, which can display bright and high contrast images, can be provided; because a reflective color liquid crystal display element having a high aperture ratio can be obtained by forming a matrix black matrix layer 65 by blackening treatment of a part of the reflector 44, with no patterning the reflecting film.

In accordance with the present embodiment, an advantage to improve the production yield of the reflective color liquid crystal display element can be achieved; because the transparent electrodes 46 requiring a high preciseness can be formed directly on one of the glass substrates by gathering the polymer layer 43,the reflector 44, and the color filters 52, 53, 54 to the other glass substrate.

Furthermore, an advantage to improve the production yield of the liquid crystal element can be achieved, because mounting and correcting the TCP, whereon the IC for driving is provided, can be performed readily.

In accordance with the present embodiment, the reflective color liquid crystal display apparatus, which can display bright and high contrast images, can be provided with a low price: because, in accordance with obtaining the color filters 52, 53 by superposed printing using the previously described three colors simultaneous printing method, not only removing the steps on the surface of the color filters, but also manufacturing the reflective color liquid crystal display element can be achieved with a low cost.

Embodiment 10

Hereinafter, a method of manufacturing the reflective liquid crystal display element and the reflective liquid crystal display apparatus of the present invention is explained referring to a set of schematic cross sections of FIG. 16.

Manufacturing step (a): A polymer layer 43 made of acrylic resin (epoxy resin or amido group resin is usable, the polymer layer can be either one of photosensitive and non-photosensitive), wherein a black pigment is dispersed, is applied (film thickness: 1.5 $\mu$m) onto a polymer base film 42 (polyethylene terephthalate, film thickness: 50 $\mu$m, depression pitch: approximately 13 $\mu$m, depression depth: 50 $\mu$m), which is a supporter having the string shaped protrusions and depressions on the surface. After dried, transcription film is prepared by providing a cover film (not shown in the figure, polyethylene, film thickness: 6 $\mu$m) on the polymer layer 43.

The transcription film 41 is transferred to the glass substrate 40 (soda glass, plate thickness: 0.7 mm) using a laminator 48 (substrate temperature: 100° C., roll temperature: 100° C., roll pressure: 6 kg/cm$^2$, moving velocity: 0.5 m/minute), subsequently main curing is performed (240° C./30 minutes), and peeling off the polymer base film 42 to form the polymer layer 43 comprising many protrusions and depressions.

Manufacturing step (b): A reflector 44 made of aluminum (silver is usable, film thickness: 100 nm) is formed on the surface of the polymer layer 44 comprising many protrusions and depressions.

Manufacturing step(c): After applying photosensitive resin 49 (non-photosensitive resin is usable, film thickness: 1.5 $\mu$m) onto the reflector 44, the photosensitive resin 49 is irradiated with ultraviolet rays 59 using a photo mask 58.

Manufacturing step (d): The photosensitive resin 49 and the reflector 44 are developed with a designated developing condition to form rectangular reflector 44 (aluminum, film thickness: 100 nm, size: 288 $\mu$m ×88 $\mu$m, interval 12 $\mu$m), and an insulating layer 45 (acrylic resin), transparent electrodes 46 (signal electrodes of ITO film, film thickness: 260 nm, number of electrodes: 640, electrode pitch: 100 μm, electrode width: 88 μm, interval between the electrodes: 12 μm), and an alignment layer 47 (polyimide, film thickness: 700 nm) are formed on the one electrode substrate.

Manufacturing step (e): The coloring layer 52 of photosensitive resin is applied onto the other glass substrate (soda glass, plate thickness: 0.7 mm). Then, the coloring layer 52 of the photosensitive resin is irradiated with ultraviolet rays 59 via the photo mask 58 to form the color filter.

Manufacturing step (f): The photosensitive color filter 51 is developed with a designated developing condition to form a color filter 52 of any one of red, green, and blue (yellow, cyan, and magenta are usable).

Manufacturing step (g): The color filters 53, 54 are formed by repeating the same manufacturing step as the color filter 52.

Manufacturing step (h): After forming the leveling layer 55 (either one of photosensitive resin and non-photosensitive resin is usable, film thickness: 2.5 μm) onto the color filters 52, 53, 54, the transparent electrode 56 (ITO, scanning electrodes of: film thickness: 260 nm, number of the electrode: 240, electrode pitch: 300 μm, electrode width: 288 μm, interval between the electrodes: 12 μm), and the alignment layer 42 (polyimide group, film thickness: 70 nm) are formed thereon.

Manufacturing step (i): One of the above two electrode substrates manufactured by the manufacturing steps from (a) to (d) and the other electrode substrate manufactured by the manufacturing steps from (e) to (i) are arranged so that each of the transparent electrodes 46, 56 faces each other, and the both electrode substrates are matched via spacer material 60 of polymer beads having a particle size equivalent to the thickness of the liquid crystal 61 (particle size: 6 μm).

Then, the reflective color liquid crystal display element was formed by sealing the both electrode substrates with a sealing material, which is made of epoxy rein wherein the above spacer material is dispersed, formed at peripheries of the substrates, filling the liquid crystal 61 ((a liquid crystal composition composed of cyano PCH and a transfer derivative, refractive index anisotropy Δn: 0.133, twisted angle: 250°) into the interval between the two electrode substrates, and sealing (photosensitive acrylic resin or photosensitive epoxy resin) the interval.

As indicated in FIG. 12, a reflective color liquid crystal display element was composed by arranging designated phase plates 63, 64, and a polarizer 62 onto the glass substrate 50 of the reflective color liquid crystal display element.

As indicated in FIG. 12, a reflective color liquid crystal display apparatus was composed by mounting a tape carrier package 71 mounted with IC for driving the liquid crystal, and an external circuit for driving 72 on the liquid crystal display element 70.

Embodiment 11

Hereinafter, a method of manufacturing the other reflective liquid crystal display element and the reflective liquid crystal display apparatus of the present invention is explained referring to a set of schematic cross sections of FIG. 17.

Manufacturing step (a): A polymer layer 43 made of acrylic resin (epoxy resin or amido group resin is usable, the polymer layer can be either one of photosensitive and non-photosensitive), wherein a black pigment is dispersed, is applied (film thickness: 1.5 μm) onto a polymer resist film 42 (polyethylene terephthalate, film thickness: 50 μm, depression pitch: approximately 13 μm, depression depth: 1.0 μm), which is a supporter having the string shaped protrusions and depressions on the surface. After dried the resin, transcription film is prepared by providing a cover film (not shown in the figure, polyethylene, film thickness: 6 μm) on the polymer layer 43.

The transcription film 41 is transcribed to the glass substrate 40 (soda glass, plate thickness: 0.7 mm) using a laminator 48 (substrate temperature: 100° C., roll temperature: 100° C., roll pressure: 6 kg/cm², moving velocity: 0.5 m/minute), subsequently main curing is performed (240° C./30 minutes), and peeling off the polymer resist film 42 to form the polymer layer 43 comprising many protrusions and depressions.

Manufacturing step (b): A reflector 44 made of aluminum (silver is usable, film thickness: 100 nm) is formed on the surface of the polymer layer 43 comprising many protrusions and depressions.

Manufacturing step (c): After applying photosensitive resin 49 (non-photosensitive resin is usable, film thickness: 1.5 μm) onto the reflector 44, the photosensitive resin 49 is irradiated with ultraviolet rays 59 using a photo mask 58.

Manufacturing step (d): The photosensitive resin 49 and the reflector 44 are developed with a designated developing condition to form rectangular reflector 44 (aluminum, film thickness: 100 nm, size: 288 μm×88 μm, interval 12 μm), and an insulating layer 45 (acrylic resin), transparent electrodes 46 (signal electrodes of ITO film, film thickness: 260 nm, number of electrodes: 640, electrode pitch: 100 μm, electrode width: 88 μm, interval between the electrodes: 12 μm), an alignment layer 47 (polyimide, film thickness: 700 nm) are formed on the one electrode substrate.

Manufacturing step (e): The coloring layer 52 of photosensitive resin is applied onto the other glass substrate (soda glass, plate thickness: 0.7 mm). Then, the coloring layer 52 of the photosensitive is irradiated with ultraviolet rays 59 via the photo mask 58 for forming the color filter.

Manufacturing step (f): The photosensitive color filter 51 is developed with a designated developing condition to form a color filter 52 of any one of red, green, and blue (yellow, cyan, and magenta are usable).

Manufacturing step (g): The color filters 53, 54 are formed by repeating the same manufacturing step as the color filter 52.

Manufacturing step (h): After forming the leveling layer 55 (either one of photosensitive resin and non-photosensitive resin is usable, film thickness: 2.5 μm) onto the color filters 52, 53, 54, the transparent electrode 56 (ITO, scanning electrodes of: film thickness: 260 nm, number of the electrode: 240, electrode pitch: 300 μm, electrode width: 288 μm, interval between the electrodes: 12 μm), and the alignment layer 57 (polyimide group, film thickness: 70 nm) are formed thereon.

Manufacturing step (i): One of the above two electrode substrates manufactured by the manufacturing steps from (a) to (d) and the other electrode substrate manufactured by the manufacturing steps from (e) to (i) are arranged so that each of the transparent electrodes 46, 56 faces each other, and the both electrode substrates are matched via spacer material 60 of polymer beads having a particle size equivalent to the thickness of the liquid crystal 61 (particle size: 6 μm).

Then, the reflective color liquid crystal display element was formed by sealing the both electrode substrates with a sealing material, which is made of epoxy rein wherein the above spacer material is dispersed, formed at peripheries of the substrates, filling the liquid crystal 61 ((a liquid crystal composition composed of cyano PCH and a transfer derivative, refractive index anisotropy Δn: 0.133, twisted angle: 250°) into the interval between the two electrode substrates, and sealing (photosensitive acrylic resin or photosensitive epoxy resin) the interval.

As indicated in FIG. 12, a reflective color liquid crystal display element was composed by arranging designated phase plates 63, 64, and a polarizer 62 onto the glass substrate 50 of the reflective color liquid crystal display element.

As indicated in FIG. 12, a reflective color liquid crystal display apparatus was composed by mounting a tape carrier package 71 mounted with IC for driving the liquid crystal, and an external driving circuit 72 on the liquid crystal display element 70.

In accordance with the present embodiment, the polymer layer comprising fine protrusion and depression planes composed of string shaped protrusions or string shaped depressions is formed by transcription method, which is advantageous in decreasing cost, but the same polymer layer can be obtained by a printing method, a photolithography method, and the like. The feature of the present invention is in forming the fine protrusion and depression planes with a string shaped pattern, and the present invention is not restricted by the method of manufacturing the planes.

In accordance with the present embodiment, an aluminum film, of which film thickness was 100 nm, was formed as the reflector, and a chromium film, of which film thickness was 100 nm, was formed as the black matrix layer. However, the materials and others for the reflector and the black matrix layer can be selected based on the object.

Adoption of the leveling film 55 is arbitrary based on the object. For instance, if the leveling film is formed only in the effective display region, mounting the TCP, whereon the IC for driving liquid crystal is mounted, becomes more advantageous.

As explained above, a reflective liquid crystal display apparatus having no coloring by optical interference, which can obtain bright images, can be provided; because protrusions and depressions for collecting incident light in a direction to viewers can be arranged in a designated region in a closest packing manner by providing inside a reflector comprising randomly arranged smooth protrusion and depression reflecting planes, which is composed of string shaped protrusions and string shaped depressions.

Furthermore, a reflective liquid crystal display apparatus having no coloring by optical interference, which can obtain bright images, can be provided; because a composition, which can not only collect incident light from all the directions to viewers, but also decrease the flat portions which generate positive reflecting light component, is composed by providing inside a reflector, which comprises smooth protrusion and depression reflecting planes, wherein string shaped protrusions or string shaped depressions are arranged continuously and randomly, or the string shaped protrusions and the string shaped depressions are arranged alternately and randomly.

In consideration of leveling, a case that the string shaped protrusions or the string shaped depressions are arranged continuously and randomly is more preferable than a case that the string shaped protrusions and the string shaped depressions are arranged alternately and randomly, because only the height of the protrusion or the depression must be considered.

The case that the string shaped protrusions and the string shaped depressions are arranged alternately and randomly has a capability to decrease flat portions, which generate positive reflecting light component, more than the case that the string shaped protrusions or the string shaped depressions are arranged continuously and randomly.

In accordance with controlling the pattern of the string shaped protrusions or the string shaped depressions so that the length component of the string shaped protrusions and the length component of the string shaped depressions in respective directions become approximately equal, a reflective liquid crystal display apparatus, which can obtain bright images, can be provided at a low price; because a reflector, which can collect incident light from all directions in a direction to viewers, can be formed.

In accordance with controlling the pattern of the string shaped protrusions or the string shaped depressions so that the length component of the string shaped protrusions and the length component of the string shaped depressions in respective directions become different each other, a reflective liquid crystal display apparatus, which can obtain bright images, can be provided at a low price; because a reflector, which can collect incident light from a particular direction effectively in a direction to viewers, can be formed.

A reflective liquid crystal display apparatus, which can obtain bright images, can be provided with a low cost; because the patterns of the string shaped protrusions and the string shaped depressions are readily formed by providing inside the reflector comprising the string shaped protrusions and the string shaped depressions, cross sectional slope angles of which distribute approximately symmetrical from right and left.

A reflective color liquid crystal display apparatus, which can obtain bright images, can be provided with a low cost; because the reflective liquid crystal display element having a high aperture ratio can be manufactured by coloring the polymer layer having the smooth protrusion-depression planes comprising the string shaped protrusions or the string shaped depressions with black pigment and the like, and forming its structure to make patterning the reflective layer in a rectangular shape corresponding to dot size of the coloring layer.

A reflective liquid crystal display apparatus, which can obtain bright and high contrast images, can be provided with a low cost; because the liquid crystal display element, whereby forming the electrodes, and mounting and correcting the TCP provided with IC for driving the liquid crystal can be performed with a high production yield, can be manufactured by forming the reflector and the color filters on a same substrate, and forming the signal electrodes requiring a high preciseness directly onto the other glass substrate.

Furthermore, a reflective liquid crystal display apparatus, which can obtain bright and high contrast images, can be achieved with a low cost; because unnecessary reflecting light from non-aperture portions can be decreased significantly by adding black matrix function to the reflector corresponding to the black matrix layer by a method such as blackening treatment and the like.

In accordance with the present embodiment, polymer beads spacer is used, but columnar spacer also can be used.

What is claimed is:

1. A reflective color liquid crystal display apparatus having plural pixels comprising:
   a first electrode substrate, wherein
      a polymer layer having plural protrusions or depressions arranged randomly is formed on a glass substrate, and a reflective layer, color filters, transparent electrodes, and an alignment layer are formed and laminated sequentially on said polymer layer in the recited order;

a second electrode substrate, wherein
transparent electrodes and an alignment layer are formed and laminated on a glass substrate, said second electrode substrate being disposed so that said alignment layer faces the alignment layer on said first electrode substrate; and a liquid crystal layer formed by filling a liquid crystal composition into an interval between said first and second electrode substrates;

wherein said polymer layer is colored with a dispersion of black pigment, and said reflective layer is formed only at portions corresponding to an aperture of each pixel.

2. A reflective color liquid crystal display apparatus as claimed in claim 1, wherein
an optical concentration of said black pigment dispersed polymer layer is equal to or less than 3.

3. A reflective liquid crystal display apparatus comprising:
a first substrate, wherein
a polymer layer, a reflective layer, an insulating layer, transparent electrodes, and an alignment layer are formed on a glass substrate;
a second substrate, wherein
a black matrix layer, color filters, a leveling layer, transparent electrodes, and an alignment layer are formed on a glass substrate; and
liquid crystal interposed between said first and second substrates;
wherein said polymer layer is shaped in a form of continuous curves in plan view when viewed from above, and said polymer layer when viewed in cross-section has a shape of at least one of protrusions or depressions.

4. A reflective liquid crystal display apparatus comprising:
first substrate, wherein
a reflective layer, an insulating layer, transparent electrodes, and an alignment layer are formed on a glass substrate;
a second substrate, wherein
a black matrix layer, color filters, a leveling layer, transparent electrodes, and an alignment layer are formed on a glass substrate; and
liquid crystal interposed between said first and second substrates; wherein
said first substrate comprises a polymer layer formed between said glass substrate and said reflective layer, said polymer layer being shaped in a form of continuous curves in plan view when viewed from above, and said polymer layer when viewed in cross-section has a shape of protrusions and depressions, and said protrusions and said depressions are arranged alternately.

5. A reflective liquid crystal display apparatus comprising:
a first substrate, wherein
a polymer layer, a reflective layer, an insulating layer, transparent electrodes, and an alignment layer are formed on a glass substrate;
a second substrate, wherein
a black matrix layer, color filters, a leveling layer, transparent electrodes, and an alignment layer are formed on a glass substrate; and
liquid crystal interposed between said first and second substrates; wherein said polymer layer is shaped in a form of continuous curves in plan view when viewed from above, and said polymer layer when viewed in cross-section has a shape of protrusions and depressions, and a sum of the lengths of said protrusions in a first direction and a sum of the lengths of said depressions in a second direction which is substantially orthogonal to the first direction in said polymer layer are approximately equal each other.

6. A reflective liquid crystal display apparatus comprising:
a first substrate, wherein
a polymer layer, a reflective layer, an insulating layer, transparent electrodes, and an alignment layer are formed on a glass substrate;
a second substrate, wherein
a black matrix layer, color filters, a leveling layer, transparent electrodes, and an alignment layer are formed on a glass substrate; and
liquid crystal interposed between said first and second substrates;
wherein said polymer layer is shaped in a form of continuous curves in plan view when viewed from above, and said polymer layer when viewed in cross-section has a shape of protrusions and depressions, and a sum of the lengths of said protrusions in a first direction and a sum of the lengths of said depressions in a second direction which is substantially orthogonal to the first direction in said polymer layer differ from each other.

7. A reflective liquid crystal display apparatus comprising:
a first substrate, wherein
a polymer layer, a reflective layer, an insulating layer, transparent electrodes, and an alignment layer are formed on a glass substrate;
a second substrate, wherein
a black matrix layer, color filters, a leveling layer, transparent electrodes, and an alignment layer are formed on a glass substrate; and
liquid crystal interposed between said first and second substrates;
wherein said polymer layer is shaped in a form of continuous curves in plan view when viewed from above, and said polymer layer when viewed in cross-section has shape of at least one of protrusions and depressions having a substantially uniform dimension in a width direction of the curves.

8. A reflective liquid crystal display apparatus as claimed in any one of claim 3 to claim 7, wherein said protrusions or said depressions are disposed in a predetermined pattern in said polymer layer in accordance with one of an analytical simulation of spinodal decomposition and directly by spinodal decomposition.

* * * * *